United States Patent
Ooi et al.

(10) Patent No.: US 7,983,564 B2
(45) Date of Patent: Jul. 19, 2011

(54) TRANSMISSION SYSTEM AND TRANSMISSION METHOD

(75) Inventors: Hiroki Ooi, Kawasaki (JP); Akira Miura, Kawasaki (JP); Takeshi Hoshida, Kawasaki (JP); Kentaro Nakamura, Kawasaki (JP); Yasushi Sugaya, Kawasaki (JP); Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 731 days.

(21) Appl. No.: 12/068,026

(22) Filed: Jan. 31, 2008

(65) Prior Publication Data

US 2008/0199182 A1 Aug. 21, 2008

(30) Foreign Application Priority Data

Feb. 1, 2007 (JP) ................................ 2007-023369

(51) Int. Cl.
*H04J 14/02* (2006.01)

(52) U.S. Cl. .......... 398/81; 398/147; 398/158; 398/159; 385/24; 385/15; 385/122

(58) Field of Classification Search .................... 398/81, 398/147, 148, 149, 158, 159, 160, 183, 185, 398/186, 188, 192, 193, 199, 201, 83; 385/24, 385/15, 122

See application file for complete search history.

(56) References Cited

U.S. PATENT DOCUMENTS

| 7,373,040 B2 * | 5/2008 | Cai et al. ........................ 385/24 |
| 2005/0238362 A1 | 10/2005 | Sekiya et al. |
| 2009/0074417 A1 * | 3/2009 | Vassilieva et al. .............. 398/81 |

FOREIGN PATENT DOCUMENTS

| EP | 1 622 298 | 2/2006 |
| WO | 01/86849 | 11/2001 |

OTHER PUBLICATIONS

C. Hebebrand et al., "Investigations of the Dispersion Tolerance of the Nonlinear Optical Transmission Channel for Different Modulation Formats in a WDM-System", Transparent Optical Networks, Jul. 3, 2005; pp. 72-75.

G. Charlet, et al., "Nonlinear Interactions Between 10Gb/s NRZ Channels and 40Gb/s Channels with RZ-DQPSK or PSBT Format, over Low-Dispersion Fiber", ECCC 2006, (2 pages).

Extended European Search Report issued May 21, 2008 in corresponding European Patent Application No. 08001824.5.

* cited by examiner

*Primary Examiner* — Hanh Phan
(74) *Attorney, Agent, or Firm* — Staas & Halsey LLP

(57) ABSTRACT

A wavelength division multiplexing system according to the present art adjusts the amount of dispersion compensation (the amount of dispersion compensation of an NZ-DSF and a DCF) every all spans on the basis of the time slot when an intensity modulation signal transmitter outputs an intensity modulation signal and the wavelength interval when a wavelength coupler multiplexes a phase modulation signal (output from a phase modulation signal transmitter) and the intensity modulation signal.

16 Claims, 31 Drawing Sheets

FIG. 14

Assigned Wavelength Information — 450a

| Transmitter Identification Information | Wavelength |
|---|---|
| 10001 | oooo |
| 10002 | oooo |
| 10003 | oooo |
| ... | ... |

Dispersion Compensation every 2 Spans

Dispersion Compensation every 4 Spans

TRANSMISSION SYSTEM AND TRANSMISSION METHOD

BACKGROUND

1. Technical Field

The present art relates to a transmission system and a transmission method thereof for transmitting a first optical signal modulated by first transmitter and a second optical signal modulated by a second transmitter via the same transmission line. In particular, the present art relates to a transmission system and a transmission method for preventing the waveform degradation of the optical signal even if mixing a plurality of optical signals based on different modulations (phase modulation and intensity modulation).

2. Description of the Related Art

Recently, the demands for introducing a 40 Gbit/s optical transmission system of the next generation are increased, and the transmission distance and frequency using efficiency equivalent to those of a 10 Gbit/s system are required. As realizing means, RZ-DPSK (Return-to-Zero Differential Phase-Shift Keying) modulation or CSRZ-DPSK (Carrier Suppressed Return-to-Zero Differential Phase-Shift Keying) modulation is greatly researched and developed, with the excellent tolerance of Optical Signal-to-Noise Ratio (OSNR) and Nonlinear tolerance higher than those of NRZ (Non Return to Zero) modulation applied to a conventional system of 10 Gbit/s or less.

In addition to the above modulations, as disclosed in Mos. 3. 2. and 6, ECCC 2006, "Nonlinear interaction between 10 Gbit/s NRZ channels and 40 Gbit/s channels with RZ-DQPSK or PSBT format over low-dispersion fiber", written by G. Charlet et al., phase modulation such as RZ-DQPSK (Differential Quadrature Phase-Shift Keying) modulation having the feature of a narrow spectrum (high spectral utilization efficiency) or CSRZ-DQPSK modulation is also greatly researched and developed.

FIG. 27 is a diagram showing an example of the structure of an optical transmitting apparatus and an optical receiving apparatus using RZ-DPSK or CSRZ-DPSK modulation with 43 Gbit/s. Further, FIG. 28 is a diagram showing the optical intensity and the optical phase upon transmitting and receiving an RZ-DPSK or CSRZ-DPSK modulated optical signal.

Referring to FIG. 27, an optical transmitting apparatus 10 transmits an optical signal subjected to an RZ-DPSK or CSRZ-DPSK modulation with 43 Gbit/s, and comprises a transmitting data processing part 11, a CW (Continuous Wave) light source 12, a phase modulator 13, and an intensity modulator 14 for making RZ pulse.

Specifically, the transmitting data processing part 11 has a function as a framer that sets a frame of input data, a function as an FEC (Forward Error Correction) encoder that adds error correction code, and a function of a DPSK pre-coder, that performs coding processing for reflecting difference information between the current code and code before one bit thereof.

The phase modulator 13 modulates the phase of continuous light from the CW light source 12 in accordance with coding data from the transmitting data processing part 11, and outputs an optical signal having information on a binary optical phase although the optical intensity is constant, i.e., DPSK modulated optical signal (refer to the bottom in FIG. 28).

The intensity modulator 14 for making RZ pulse sets RZ pulses of the optical signal from the phase modulator 13 (refer to the top in FIG. 28). In particular, an RZ-DPSK signal denotes an optical signal that is set to RZ pulses with a clock drive signal having the same frequency (43 GHz) as that of a bit rate of data and a one-time amplitude of an on-off driving voltage ($V\pi$). Further, a CSRZ-DPSK signal denotes an optical signal that is set to RZ pulses with a clock drive signal having the half frequency (21.5 GHz) of the bit rate of data and a double amplitude of the on-off driving voltage ($V\pi$).

Moreover, an optical receiving apparatus 30 is connected to the optical transmitting apparatus 10 via a transmission line 20 and an optical repeater 21, and performs receiving signal processing of the (CS) RZ-DPSK signal via optical repeating transmission from the optical transmitting apparatus 10. For example, the optical receiving apparatus 30 comprises a delay interferometer 31, a photo-electronic converting part 32, a regeneration circuit 33, and a receiving data processing part 34.

Specifically, the delay interferometer 31 comprises an Mach-Zehnder interferometer, performs delay interference between a delay component (23.3 ps in the structure example in FIG. 27) corresponding to one-bit time and a component subjected to 0rad phase control of the (CS) RZ-DPSK signal transmitted via the transmission line 20, and outputs the interference result as two signals. Incidentally, the Mach-Zehnder interferometer is formed so that one division waveguide is longer than another division waveguide by a propagation length corresponding to one-bit time. An electrode is formed to control the phase of an optical signal that is propagated through the other division waveguide.

The photo-electronic converting part 32 comprises a dual-pin photodiode that receives the outputs from the delay interferometer 31 and thus performs balanced detection. Incidentally, the receiving signal detected by the photo-electronic converting part 32 is properly amplified by an amplifier.

The regeneration circuit 33 extracts a data signal and a clock signal from the receiving signal subjected to the balanced detection in the photo-electronic converting part 32. The receiving data processing part 34 performs signal processing such as error correction on the basis of the data signal and the clock signal extracted by the regeneration circuit 33.

FIG. 29 is a diagram showing an example of the structure of the optical transmitting apparatus and the optical receiving apparatus using the RZ-DQPSK or CSRZ-DQPSK modulation with 43 Gbit/s. FIG. 30 is a diagram showing the optical intensity and the optical phase upon transmitting and receiving the optical signal subjected to the RZ-DQPSK or CSRZ-DQPSK modulation.

Referring to FIG. 29, an optical transmitting apparatus 40 comprises a transmitting data processing part 41, a (1:2) demultiplexer (DEMUX) 42, a CW light source 43, a $\pi/2$-phase shifter 44, two phase shifters 45A and 45B, and an intensity modulator 46 for making RZ pulse.

Specifically, similarly to the transmitting data processing part 11 shown in FIG. 27, the transmitting data processing part 41 has functions of a framer and an FEC encoder, and further has a function of a DQPSK pre-coder that performs coding processing for reflecting difference information between the current core and code before one bit thereof.

The (1:2) demultiplexer 42 splits the coding data with 43 Gbit/s from the transmitting data processing part 41 into coding data #1 and #2 on two-series with 21.5 Gbit/s. The CW light source 43 outputs continuous light, the output continues light is split into two parts, one light is input to the phase shifter 45A, and the other light is input to the phase shifter 45B via the $\pi/2$ phase shifter 44.

The phase shifter 45A modulates the continuous light from the CW light source 43 with the coding data #1 on one of the two-series split by the (1:2) demultiplexer 42, and outputs an optical signal having information on binary optical phase (0rad or $\pi$ rad). The phase shifter 45B receives light obtained by shifting the phase of the continuous light from the CW light source 43 with π/2 by the π/2 phase shifter 44, modulates the input light by the coding light #2 on the other-series split by the (1:2) demultiplexer 42, and outputs an optical signal having information on a binary optical phase (π/2 rad or 3π/2 rad).

The light modulated by the phase shifters 45A and 45B is coupled and is thereafter output to the intensity modulator 46 for making RZ pulse at the latter stage. That is, the modulation light from the phase shifters 45A and 45B is coupled, thereby transmitting, to the intensity modulator 46 for making RZ pulse, an optical signal having information on a four-bit optical phase although the optical intensity is constant (refer to the bottom in FIG. 30), that is, the optical signal subjected to the DQPSK modulation.

Similarly to the intensity modulator 14 for making RZ pulse shown in FIG. 27, the intensity modulator 46 for making RZ pulse sets the DQPSK-modulated optical signals from the phase shifters 45A and 45B to RZ pulses. In particular, an RZ-DQPSK signal denotes an optical signal that is set to RZ pulses with a clock drive signal having the same frequency (21.5 GHz) of that of the bit rate of the data #1 and #2 and a one-time amplitude of an on-off driving voltage (Vπ). A CSRZ-DQPSK signal denotes an optical signal that is set to RZ pulses with a clock drive signal having the half frequency (10.75 GHz) of that of the bit rate of the data #1 and #2 and a double amplitude of the on-off driving voltage (Vπ).

An optical receiving apparatus 60 is connected to the optical transmitting apparatus 40 via a transmission line 50 and an optical repeater 51, and performs receiving signal processing of the (CS) RZ-DQPSK signal transmitted via the optical repeating from the optical transmitting apparatus 40. The optical receiving apparatus 60 comprises a branch part 61 that branches the received optical signal into two parts, and delay interferometers 62A and 62B, photo-electronic converting parts 63A and 63B, and regeneration circuits 64A and 64B, which are on the branched optical signal lines for propagating the optical signals. Further, the optical receiving apparatus 60 comprises a (2:1) multiplexer 65 that multiplexes data signal regenerated by the regeneration circuits 64A and 64B and a receiving data processing part 66.

Specifically, the delay interferometers 62A and 62B receive the optical signals obtained by two-branching the (CS) RZ-DQPSK signal transmitted via the transmission line 50 and the optical repeater 51 by the branch part 61. The delay interferometer 62A performs delay interference between a delay component corresponding to one-bit time (46.5 ps in the structure example in FIG. 29) and a component subjected to the phase control with π/4 rad, and outputs the interference results as two signals.

Further, the delay interferometer 62B performs the delay interference between the delay component corresponding to one-bit time and a component (with the phase deviated from the delay component of the delay interferometer 62A with π/2 rad) subjected to the phase control with −π/4 rad, and outputs the interference results as two signals. Herein, the delay interferometers 62A and 62B individually comprise Mach-Zehnder interferometers, and dual-pin photodiodes that perform balanced detection by receiving the outputs, respectively. Incidentally, the receiving signals detected by the photo-electronic converting parts 63A and 63B are properly amplified by an amplifier.

The regeneration circuit 64A regenerates In-phases I of the clock signal and data signal from the receiving signal subjected to the balanced detection by the photo-electronic converting part 63A. Further, the regeneration circuit 64B regenerates Quadrature-phases Q of the clock signal and data signal from the receiving signal subjected to the balanced detection by the photo-electronic converting part 63B.

The (2:1) multiplexer 65 receives the In-phases I and the Quandature-phases Q from the regeneration circuits 64A, and 64B, and converts the received phases into data signals with 43 Gbit/s before the DQPSK modulation. The receiving data processing part 66 performs signal processing such as error correction on the basis of the data signal from the (2:1) multiplexer 65.

As mentioned above, from the market, a wavelength multiplexing transmission system is demanded, in which a phase modulation signal (signal modulated by the (CS) RZ-DQPSK modulation or (CS) RZ-DPSK modulation) with 40 Gbit/s and a conventional intensity modulation signal (signal modulated by NRZ modulation) with 10 (2.5) Gbit/s are mixed.

In this case, there is a problem that the phase modulation signal is subjected to optical phase shift with XPM (Cross Phase Modulation) from the intensity modulation signal, a waveform of the phase modulation signal obviously deteriorates, and the transmission at a long distance is not possible.

That is, even if mixing the phase modulation signal and the intensity modulation signal on the same network, it is a serious problem to prevent the waveform degradation (XPM degradation) of the phase modulation signal.

SUMMARY

It is an object of the present art to provide a transmission system and a transmission method that prevent the waveform degradation of a phase modulation signal even if mixing the phase modulation signal and an intensity modulation signal on the same network.

According to the first aspect of the present art, a transmission system transmits a first optical signal modulated by a first transmitter and a second optical signal modulated by a second transmitter via the same transmission line. The first optical signal is an optical signal modulated by phase modulation, and the second optical signal is an optical signal modulated by intensity modulation. The transmission system comprises:
  a wavelength division multiplexing unit that generates a multiplexing optical signal that is obtained by multiplexing the first optical signal and the second optical signal by wavelength division multiplexing; and
  a dispersion compensating unit that adjusts the amount of dispersion compensation of the multiplexing optical signal so that the absolute of the amount of residual dispersion every all spans generated in the multiplexing optical signal is a threshold or more in the transmission via the transmission line.

Further, according to the first aspect of the present art, the amount of dispersion compensation of the dispersion compensating unit is adjusted on the basis of a time slot when the second transmitter transmits the second optical signal and the wavelength interval between the first optical signal and the second optical signal multiplexed by the wavelength division multiplexing unit.

Furthermore, according to the first aspect of the present art, the transmission system further comprises:
  pre-dispersion compensating unit that performs dispersion compensation of the multiplexing optical signal at a transmitting terminal, generated by the wavelength division multiplexing unit, and sets a value of the amount of residual dispersion of the multiplexing optical signal to the negative. In the transmission system, a chirping parameter is set to the positive when the second transmitter generates the second optical signal.

In addition, according to the first aspect of the present art, the wavelength division multiplexing unit is arranged so that the wavelength interval between the wavelength to which the first optical signal is assigned and the wavelength to which the second optical signal is assigned have a predetermined value or more upon multiplexing the first optical signal and the second optical signal.

In addition, according to the first aspect of the present art, the wavelength division multiplexing unit assigns the first optical signals to a short wavelength side of the multiplexing optical signal, and assigns the second optical signals to a long wavelength side of the multiplexing optical signal.

In addition, according to the first aspect of the present art, the wavelength division multiplexing unit assigns the first optical signals to a long wavelength side of the multiplexing optical signal, and assigns the second optical signals to a short wavelength side of the multiplexing optical signal.

In addition, according to the first aspect of the present art, the wavelength division multiplexing unit assigns the first optical signal and the second optical signal to the wavelengths of the multiplexing optical signal on the basis of the amount of residual dispersion every all spans for the wavelength of the dispersion compensating unit.

In addition, according to the first aspect of the present art, the dispersion compensating unit is arranged on the transmission line every predetermined span.

In addition, according to the first aspect of the present art, the dispersion compensating unit arranged on the transmission line has a non-equally adjusted amount of dispersion compensation.

According to the second aspect of the present art, a transmission method of a transmission system transmits a first optical signal modulated by a first transmitter and a second optical signal modulated by a second transmitter via the same transmission line. In the transmission method, the first optical signal is an optical signal modulated by phase modulation, and the second optical signal is an optical signal modulated by intensity modulation. The transmission method comprises:

a wavelength division multiplexing step of generating a multiplexing optical signal obtained by the first optical signal and the second optical signal with wavelength division multiplexing; and a dispersion compensating step of enabling a dispersion compensating apparatus having the adjusted amount of dispersion compensation of the multiplexing optical signal to pass the multiplexing optical signal so that the absolute of the amount of residual dispersion every all spans, generated in the multiplexing optical signal is a threshold or more, in transmission via the transmission line.

According to the present art, the first optical signal is an optical signal obtained by phase modulation, and the second optical signal is an optical signal obtained by intensity modulation. The first optical signal and second optical signal are multiplexed by wavelength division multiplexing, and the dispersion compensating unit having the adjusted amount of dispersion compensation of the multiplexing optical signal is used so that the amount of wavelength dispersion generated in the multiplexing optical signal via the transmission line is a threshold or more. Even if multiplexing the first optical signal modulated by the phase modulation and the second optical signal modulated by the intensity modulation on the same optical transmission line, it is possible to prevent the waveform degradation of the first optical signal modulated by the phase modulation.

Further, according to the present art, the amount of dispersion compensation is adjusted on the basis of the time slot when the second transmitter transmits the second optical signal and the channel spacing between the multiplexed first optical signal and second optical signal. Therefore, a dispersion map can be best set and the influence from the waveform degradation can be suppressed at the minimum level.

Furthermore, according to the present art, the multiplexing optical signal before generating the chromatic dispersion at the transmitting terminal is subjected to the dispersion compensation and a residual dispersion value of the multiplexing optical signal is set to the negative. Therefore, the range of the amount of residual dispersion of in-line dispersion to be set is wide and the transmission system can be structured without limit.

In addition, according to the present art, since a chirping parameter when the second transmitter generates the second optical signal is set to the negative, the waveform degradation of the optical signal can be prevented.

In addition, according to the present art, upon multiplexing the first optical signal and the second optical signal, the interval between the wavelength to which the first optical signal is assigned and the wavelength to which the second optical signal is assigned is controlled to have a predetermined value or more, and the waveform degradation of the optical signal can be prevented.

In addition, according to the present art, a plurality of the first optical signal are concentratedly assigned to the short-wavelength side of the multiplexing optical signal, and a plurality of the second optical signal are concentratedly assigned to the long-wavelength side of the multiplexing optical signal. Therefore, the waveform degradation of the optical signal can be prevented.

In addition, according to the present art, a plurality of the first optical signal are concentratedly assigned to the long-wavelength side of the multiplexing optical signal and a plurality of the second optical are concentratedly assigned to the short-wavelength side of the multiplexing optical signal. Therefore, the waveform degradation of the optical signal can be prevented.

In addition, according to the present art, the first optical signal and the second optical signal are assigned to wavelengths of the multiplexing optical signals on the basis of residual dispersion every all spans of the wavelength of the dispersion compensating apparatus. Therefore, the waveform degradation of the optical signal can be prevented.

In addition, according to the present art, the dispersion compensating apparatus is arranged on the transmission line per predetermined span. Therefore, the number of times for setting the residual dispersion to the zero is reduced and the waveform degradation of the optical signal can be prevented.

In addition, according to the present art, the dispersion compensation is performed with the dispersion compensating apparatus having a non-equally adjusted amount of dispersion compensation. Therefore, the number of times for setting the residual dispersion to the zero is reduced and the waveform degradation of the optical signal can be prevented.

BRIEF DESCRIPTION OF THE DRAWINGS

FIG. 14 is a diagram showing an example of data structure of assigned wavelength information.

DESCRIPTION OF THE PREFERRED EMBODIMENTS

Hereinbelow, a transmission system and a transmission method will be described according to preferred embodiments of the present art with reference to the drawings.

First Embodiment

Figure 31:
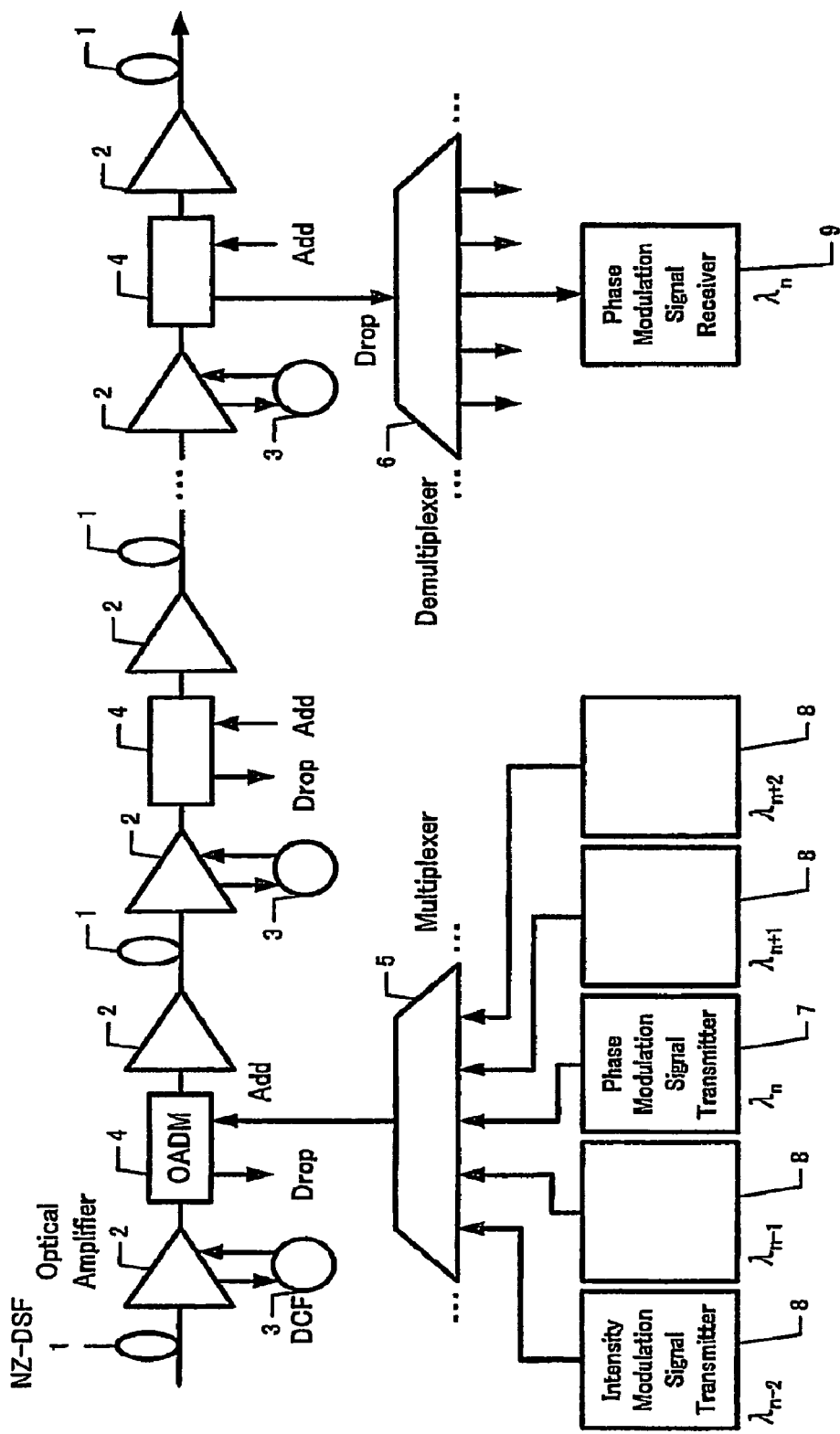
FIG. 31 is a diagram showing a conventional wavelength multiplexing transmission system mixedly having the phase modulation signal and the intensity modulation signal.

First of all, a description will be given of a conventional wavelength multiplexing transmission system mixedly having a phase modulation signal (e.g., signal subjected to RZ-DPSK (CSRZ-DPSK) modulation or RZ-DQPSK (CSRZ-DQPSK) modulation) and an intensity modulation signal (e.g., signal subjected to NRZ modulation). FIG. 31 is a diagram showing a conventional wavelength multiplexing transmission system mixedly having the phase modulation signal and the intensity modulation signal.

Referring to FIG. 31, the wavelength multiplexing transmission system comprises: an NZ-DSF (Non-Zero Dispersion Shifted Fiber) 1; an optical amplifier 2; a DCF (Dispersion Compensating Fiber) 3; an OADM (Optical Add-Drop Multiplexer) 4; a multiplexer 5; a demultiplexer 6; a phase modulation signal transmitter 7; an intensity modulation signal transmitter 8; and a phase modulation signal receiver 9.

Among the components, the DCF 3 is a dispersion compensator (typically, a dispersion compensating fiber) that compensates for the wavelength dispersion of an optical signal transmitted via the NZ-DSF 1 serving as a transmission line. The optical amplifier 2 is an optical amplifier that amplifiers the optical signal, and the OADM 4 is an add/drop multiplexer that inserts or branches the signal assigned per optical wavelength.

The multiplexer 5 couples the phase modulation signal output from a phase signal optical transmitter 7 and the intensity modulation signal output from the intensity modulation signal transmitter 8, and outputs the coupled optical signal to the OADM 4.

Upon obtaining the optical signal from the OADM 4, the demultiplexer 6 splits the obtained optical signal every optical wavelength, and outputs, to the phase modulation signal receiver 9, the phase modulation signal output from the phase modulation signal transmitter 7. Further, the demultiplexer 6 outputs another signal (the intensity modulation signal) to an intensity modulation signal receiver (not shown).

Herein, the phase modulation signal transmitter 7 sends an optical signal subjected to RZ-DPSK (CSRZ-DPSK) modulation or RZ-DQPSK (CSRZ-DQPSK) modulation with 40 Gbit/s (specifically, refer to FIGS. 27 to 30), and the intensity modulation signal transmitter 8 outputs an optical signal subjected to NRZ modulation with 10 G (bit/s) or 2.5 Gbit/s. Further, the phase modulation signal receiver 9 is connected to the phase modulation signal transmitter 7 via the multiplexer 5, the OADM 4, the optical amplifier 2, the NZ-DSF 1, the DCF 3, and the demultiplexer 6, and performs receiving signal processing of the phase modulation signal from the phase modulation signal transmitter 7, transmitted via optical repeating (specifically, FIGS. 27 to 30).

Figure 1:
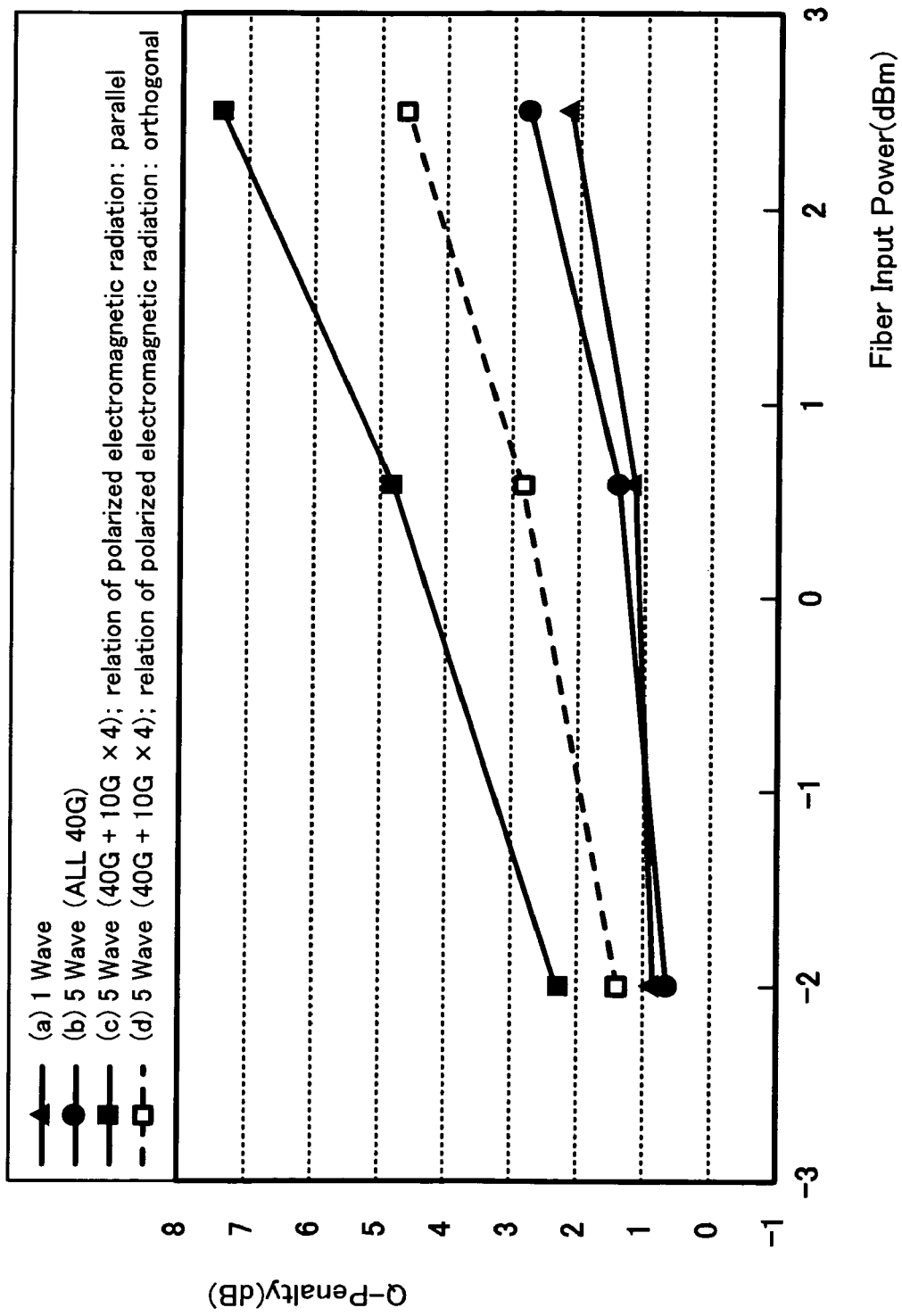
FIG. 1 is a diagram showing XPM degradation between a phase modulation signal and an intensity modulation signal.

Subsequently, a description will be given of the XPM degradation caused by the wavelength multiplexing transmission system shown in FIG. 31. FIG. 1 is a diagram showing the XPM degradation between the phase modulation signal and the intensity modulation signal. Referring to FIG. 1, as an example, a bit rate of the phase modulation signal is 40 Gbit/s, and a bit rate of the intensity modulation signal is 10 Gbit/s. Incidentally, FIG. 1 shows a result of transmitting the optical signal for 12 spans via the NZ-DSF having a distance of 50 km. Hereinbelow, one span is expressed that the optical signal output from the NZ-DSF is input to the next NZ-DSF via a transmission line.

As shown in FIG. 1, (a) when the phase modulation signal comprises one wave or (b) when all the multiplexed optical signals are phase modulation signals, even if increasing the intensity (e.g., the intensity of the optical signal at the time for inputting the optical signal from the optical amplifier 2 to the transmission line) of the optical signal input to an optical fiber, the Q penalty is reduced (the Q penalty is an index showing the quality of a transmitting signal and, if the Q penalty is large, the bit error rate of the optical signal is large).

However, (c) and (d) when the multiplexed optical signal mixedly has the phase modulation signal and the intensity modulation signal (e.g., mixedly having one phase modulation signal and four intensity modulation signals), as the intensity of the optical signal input to the optical fiber is higher, the Q penalty is increased. In particular, (c) when a relation between a polarized phase modulation signal and a polarized intensity modulation signal is parallel, the Q penalty is increased (the influence of the XPM degradation is increased).

Figure 2:
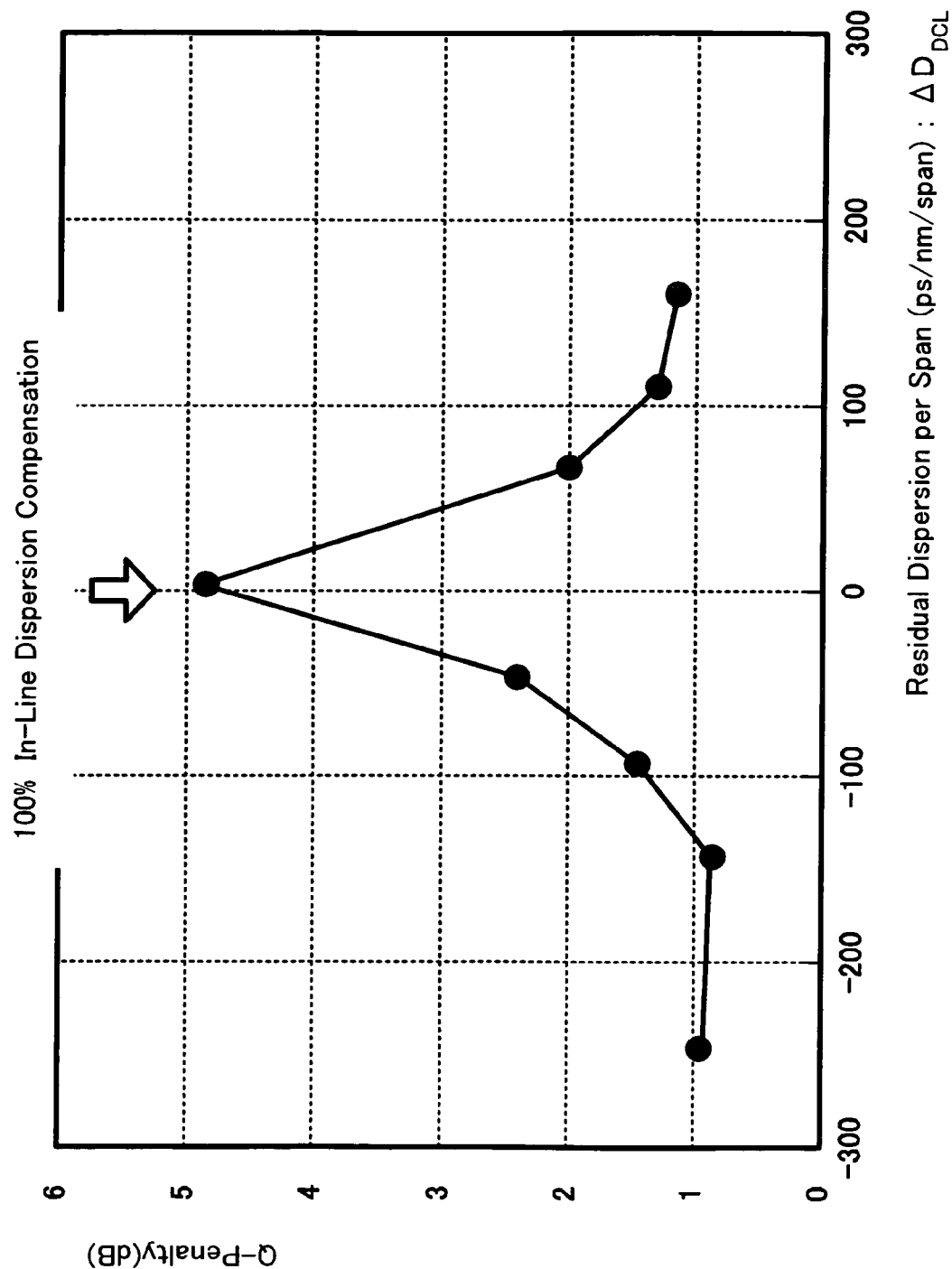
FIG. 2 is a diagram showing a relationship between the in-line residual dispersion amount and Q penalty.

Subsequently, a description will be given of a relationship between the in-line residual dispersion amount and the Q penalty in the NZ-DSF and the DCF. Herein, the in-line residual dispersion amount denotes the amount (average between spans) of residual dispersion generated in the transmission line and the DCF every all spans. FIG. 2 is a diagram showing the relationship between the in-line residual dispersion amount and the Q penalty.

Referring to FIG. 2, obviously, the Q penalty is clearly generated near the in-line residual dispersion amount that is 0 (ps/nm/span) (100% dispersion compensation). Because, when the in-line residual dispersion amount is low, the delay amount (bit delay) of the phase modulation signal substantially matches that of the intensity modulation signal at the output position (of the optical amplifier 2 and the OADM 4 shown in FIG. 31).

When the delay amount of the phase modulation signal matches that of the intensity modulation signal at the output position of each repeating node (e.g., the optical amplifier), the signal bit of the phase modulation signal always undergoes the optical phase shift from the signal bit of the same intensity modulation signal. Therefore, every passage of spans (passage via the repeating node), the degradation is accumulated. Therefore, the wavelength multiplexing transmission system needs to be structured so as to obtain a dispersion map having a large in-line residual dispersion amount.

In the example shown in FIG. 2, at an area where the in-line residual dispersion amount is substantially not less than 150 ps/nm/span or substantially not more than −150 ps/nm/span, the value of the Q penalty is converged to the minimum value. Therefore, the amount of residual compensation of the transmission line (NZ-DSF) and DCF every all spans is adjusted so that the in-line residual dispersion amount is substantially not less than 150 ps/nm/span or approximately not more than −150 ps/nm/span, thereby reducing the XPM degradation.

Herein, a description will be given of an area of large XPM-degradation and an area of small XPM-degradation on a graph with the distance and accumulated dispersion.

Figure 3:
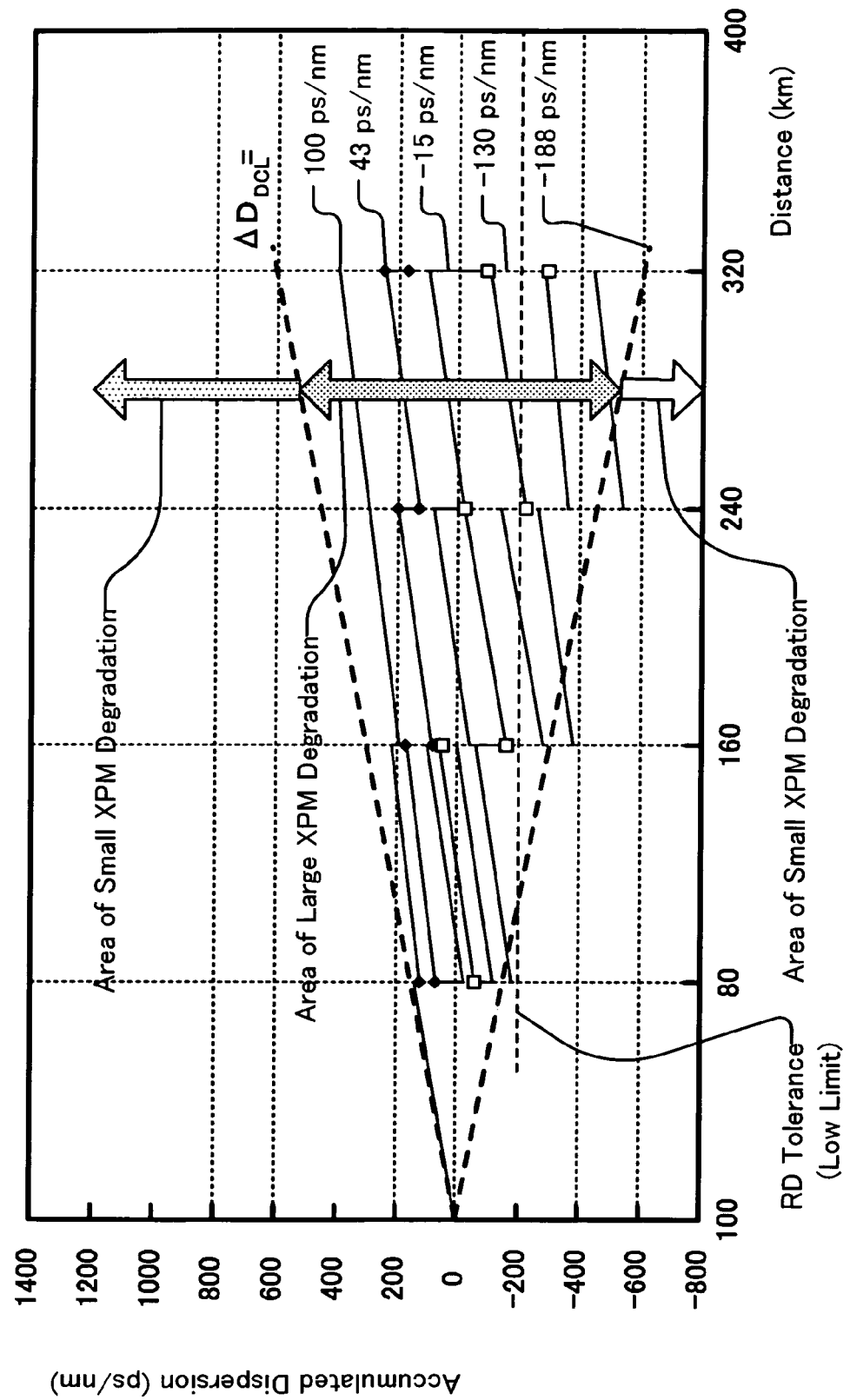
FIG. 3 is a diagram for illustrating an area of small XPM-degradation and an area of large XPM-degradation.

FIG. 3 is a diagram for illustrating the area of large XPM-degradation or the area of small XPM-degradation. Referring to FIG. 3, the XPM degradation is large at an area where the in-line residual dispersion amount ($\Delta D_{DCL}$) is substantially not less than 150 ps/nm/span and substantially not more than −150 ps/nm/span, and the XPM degradation is small at an area except for the above area (area where the in-line residual dispersion amount is substantially not less than 150 ps/nm/span and substantially not more than −150 ps/nm/span).

At the area of large XPM-degradation, i.e., the in-line residual dispersion amount needs to be adjusted so that the accumulated dispersion is increased/decreased as the distance is longer/shorter.

Figure 4:
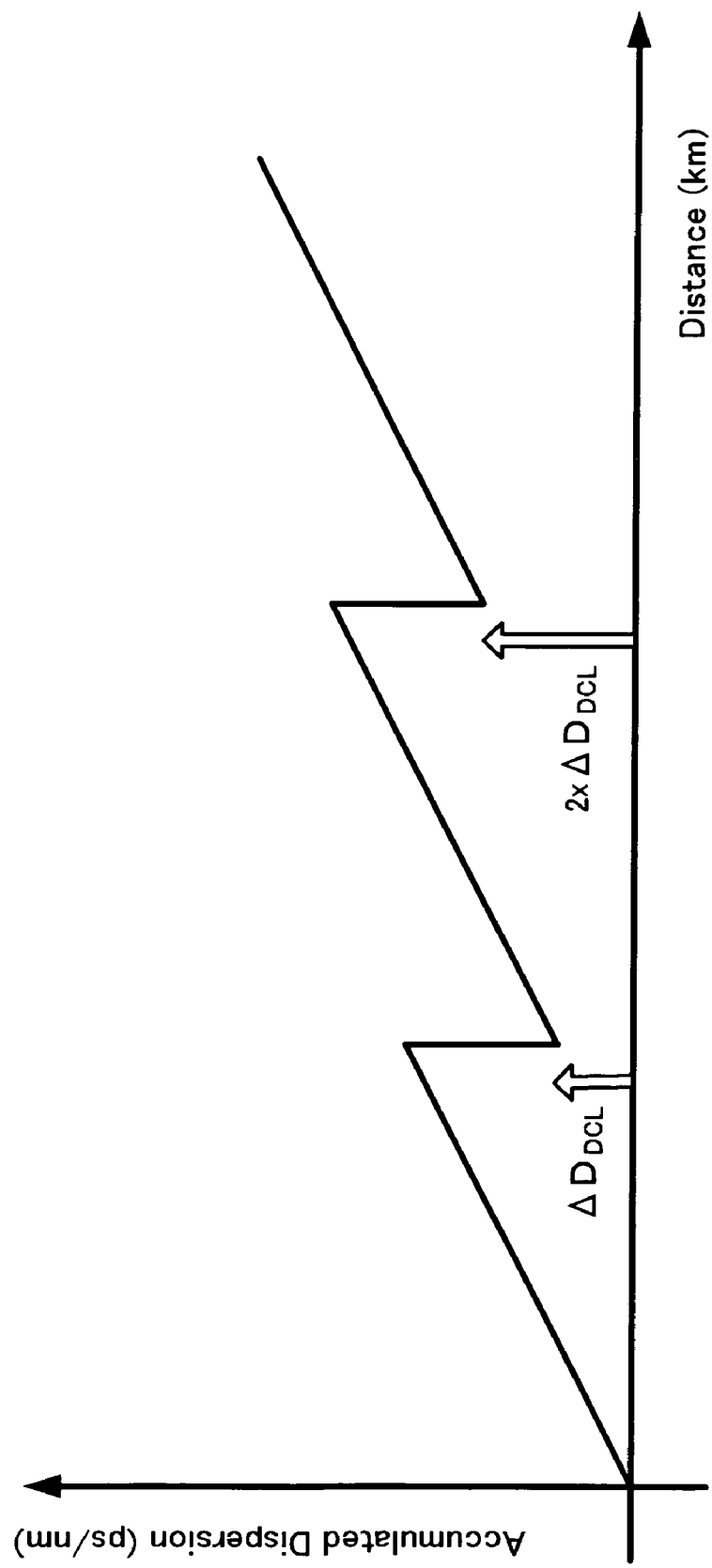
FIG. 4 is a diagram showing a relationship between the transmission distance and accumulated dispersion when a value of in-line residual dispersion is the positive.

FIG. 4 is a diagram showing a relationship between the transmission distance and the accumulated dispersion when the value of the in-line residual dispersion ($\Delta D_{DCL}$) is the positive. The value of the in-line residual dispersion is the positive, therefore, even if passing through the NZ-DSF and DCF, the accumulated dispersion does not completely return to 0 ps/nm, and the accumulated dispersion is increased in accordance with the transmission distance. Hereinbelow, the dispersion map is expressed as a relationship between the transmission distance of the optical signal and the accumulated dispersion.

Next, a description will be given of a considering result of an index of an allowable range of the in-line residual dispersion amount. The delay between adjacent channels corresponds to the delay amount of signal bits between adjacent optical wavelengths in the optical signals assigned to the optical wavelengths with the wavelength division multiplex, and the delay between adjacent channels generated every all spans can be expressed as follows.

Delay between adjacent channels=the in-line residual dispersion amount (ps/nm)×wavelength interval (nm)         (1)

Herein, the wavelength interval shows the interval between the adjacent optical wavelengths upon assigning the optical signals to the optical wavelengths with the wavelength division multiplexing.

When the delay difference between adjacent channels is lower than one time slot of the intensity modulation signal (interval for transmitting the signal bit; e.g., 100 ps), the XPM degradation is large. Therefore, obviously, the absolute of the in-line residual dispersion amount is large so as to satisfy the following condition.

|the in-line residual dispersion amount (ps/nm)|>one time slot (ps) of the intensity modulation signal÷wavelength interval (nm)         (2)

(where || is the absolute)

Figure 5:
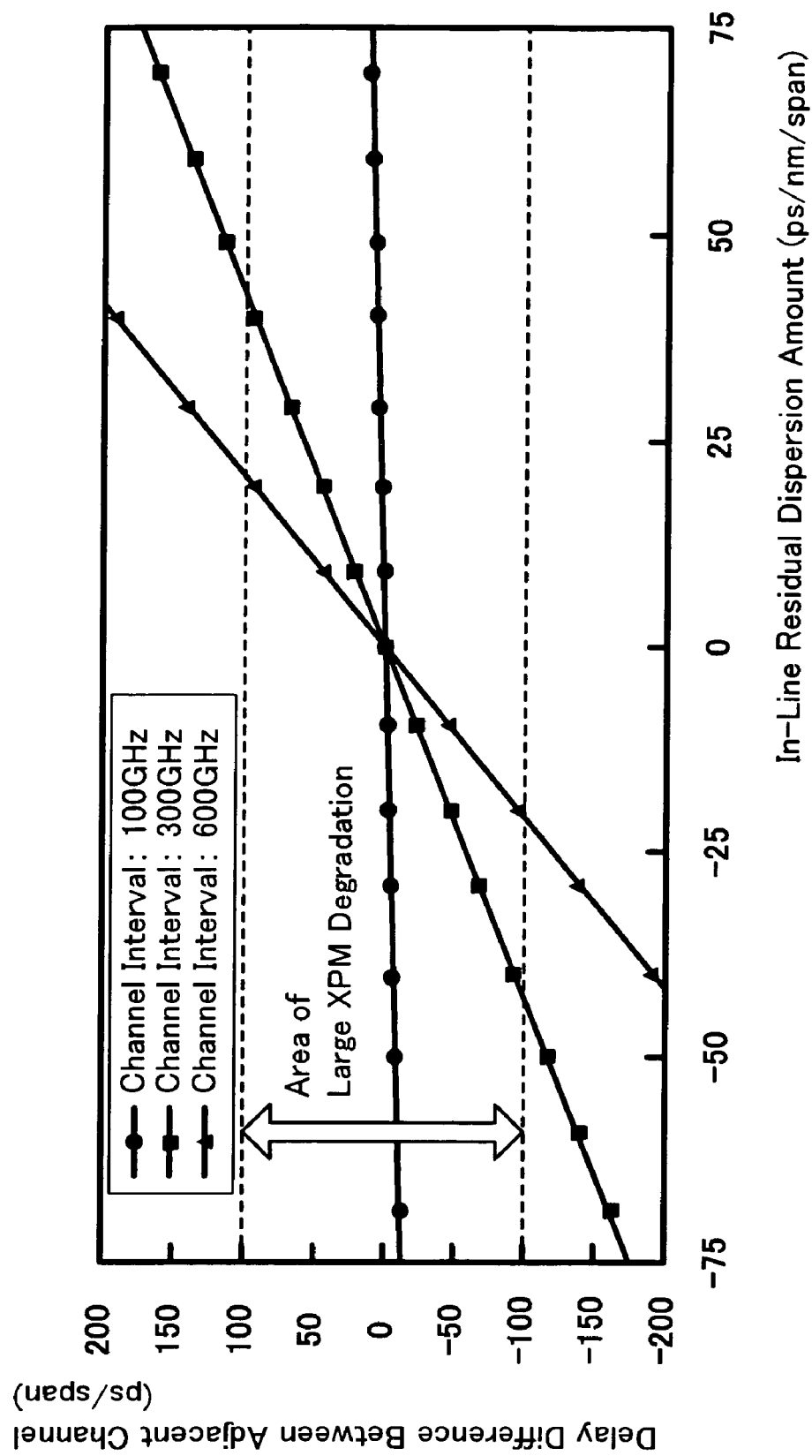
FIG. 5 is a diagram showing a relationship among the delay difference between adjacent channels, the in-line residual dispersion amount, and interval of an adjacent channel.

FIG. 5 is a diagram showing a relationship among the in-line residual dispersion amount, the delay difference between adjacent channels, and the interval between adjacent channels. Referring to FIG. 5, when the interval between the adjacent channels is small, the XPM degradation is large only if increasing the absolute of the in-line residual dispersion amount. On the other hand, when the interval between the adjacent channels is large, the XPM degradation is suppressed if not increasing the absolute of the in-line residual dispersion amount.

When the interval between the adjacent channels is 100 GHz, if not further increasing the absolute of the in-line residual dispersion amount from 125 (ps/nm/span), the XPM degradation is large. However, when the interval between the adjacent channels is 600 GHz, if the absolute of the in-line residual dispersion amount is larger than approximately 20 (ps/nm/span), the XPM degradation is suppressed. That is, as the interval between the adjacent channels is larger, the XPM degradation is suppressed without increasing the in-line residual dispersion amount.

Figure 6:
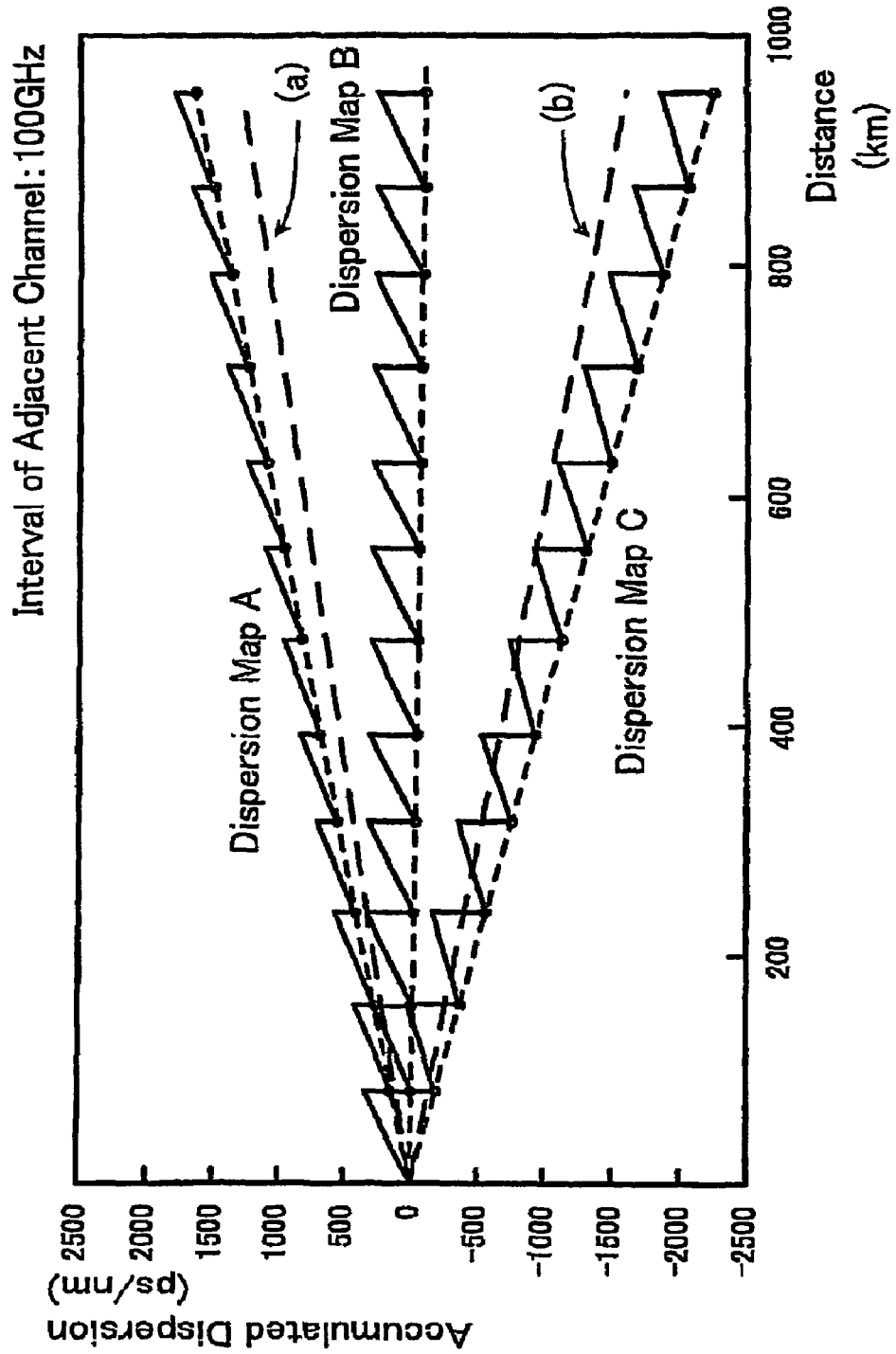
FIG. 6 is a diagram showing a dispersion map when the interval of the adjacent channel is 100 GHz.

FIG. 6 is a diagram showing a dispersion map when the interval between the adjacent channels is 100 GHz. Referring to FIG. 6, the area of large XPM-degradation exists between an upper limit (a) of the XPM degradation area and a lower limit (b) of the XPM degradation. The inclination of the upper limit (a) of the XPM degradation is as follows.

Inclination of upper limit (a) of XPM degradation=one time slot (ps)÷wavelength interval (nm)

The inclination of the lower limit (b) of the XPM degradation is as follows.

Inclination of upper limit (b) of XPM degradation=−1×1 time slot (ps)÷wavelength interval (nm).

Referring to FIG. 6, if structuring the wavelength multiplexing transmission system corresponding to a dispersion map A having not less than the upper limit (a) of the XPM degradation area or a dispersion map-C having not more than the lower limit (b) of the XPM degradation area, the XPM degradation is greatly suppressed. On the contrary, if structuring the wavelength multiplexing transmission system corresponding to a dispersion map B included within the range from the upper limit (a) of the XPM degradation area to the lower limit (b) of the XPM degradation area, the XPM degradation is large.

Figure 7:
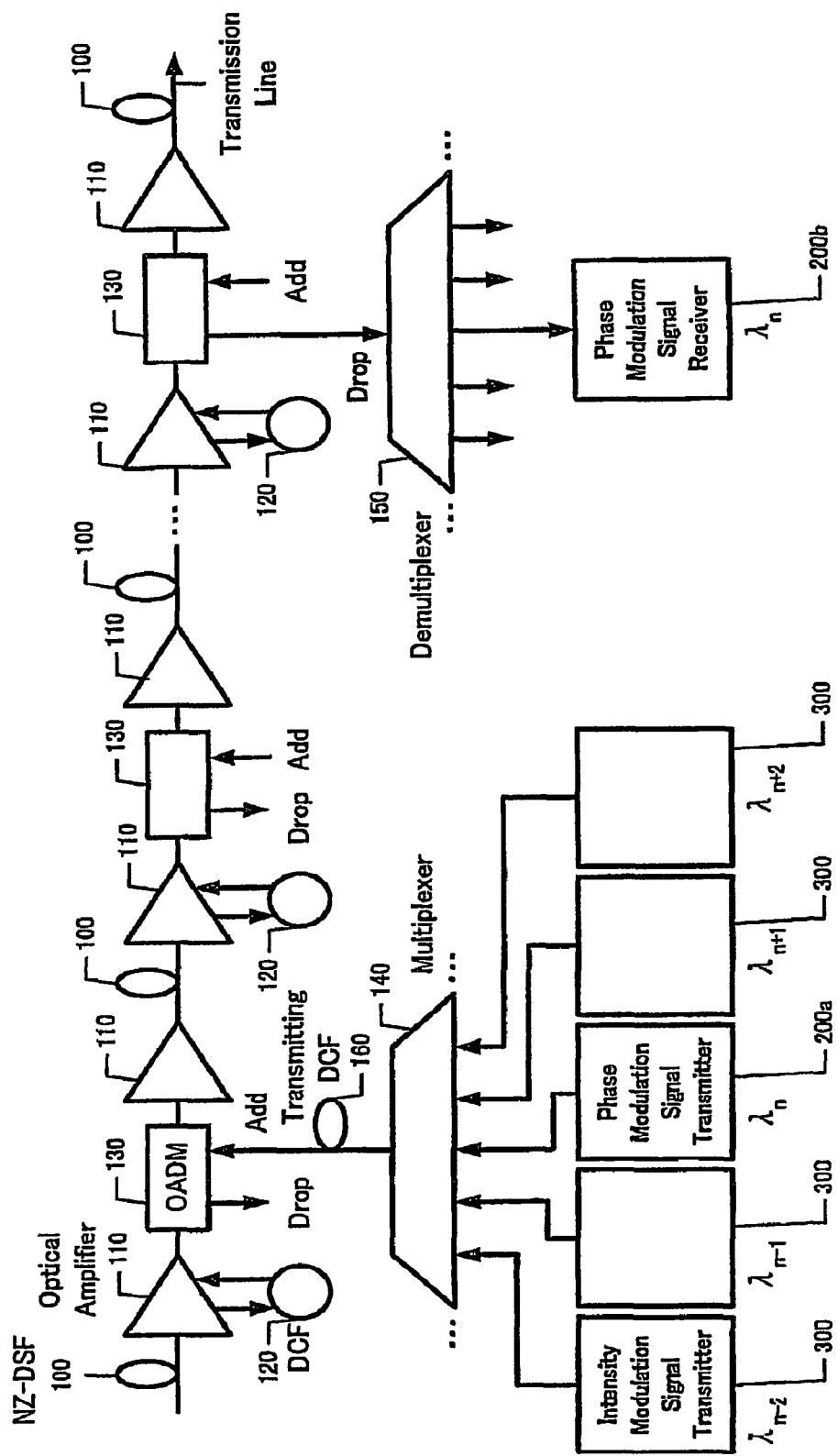
FIG. 7 is a diagram showing the structure of a wavelength multiplexing transmission system according to the first embodiment.

With the foregoing, a description will be given of the structure of the wavelength multiplexing transmission system according to the first embodiment. FIG. 7 is a diagram showing the structure of the wavelength multiplexing transmission system according to the first embodiment. Referring to FIG. 7, the wavelength multiplexing transmission system comprises: an NZ-DSF 100; an optical amplifier 110; a DCF 120; an OADM 130; a multiplexer 140; a demultiplexer 150; a transmitting DCF 160; a phase modulation signal transmitter 200a; a phase modulation signal receiver 200b; and an intensity modulation signal transmitter 300.

Among the components, the DCF 120 is a dispersion compensator (typically, dispersion compensating fiber) that compensates for the wavelength dispersion of the optical signal transmitted via the NZ-DSF 100 as a transmission line. Further, for the NZ-DSF 100 and the DCF 120 assigned to each span, the amount of in-line dispersion compensation is adjusted so that the dispersion map is not included in an area of large XPM-degradation (that is, the dispersion map is included in an area of small XPM-degradation, refer to FIG. 6).

That is, the NZ-DSF 100 and the DCF 120 included in the wavelength multiplexing transmission system according to the first embodiment adjusts the amount of residual dispersion (that is, the in-line residual dispersion amount) generated in the DCF 120 so as to satisfy the condition of the above expression (2). For the DCF 120, the amount of dispersion compensation is determined depending on the length of the DCF 120 and the length of the DCF 120 is therefore adjusted in advance so as to satisfy the condition of the expression (2).

If one time slot is 100 (ps) and the wavelength interval is 0.8 (nm) (the wavelength interval corresponds to approximately 100 GHz), the absolute of the in-line residual dispersion amount is 125 (ps/nm). Therefore, a network administrator adjusts the DCF 120 so that the in-line dispersion amount is not less than 125 (ps/nm) or not more than −125 (ps/nm).

The optical amplifier 110 increases an input optical signal. The OADM 130 is a multiplexer that adds or extracts a signal assigned to each optical wavelength.

The multiplexer 140 couples the phase modulation signal output from the phase modulation signal transmitter 200a and the intensity modulation signals output from the intensity modulation signal transmitters 300, and outputs the coupled optical signal to the OADM 130.

Upon obtaining the optical signal from the OADM 130, the demultiplexer 150 splits the obtained optical signal every optical wavelength, and outputs, e.g., the phase modulation signal output from the phase modulation signal transmitter 200a to the phase modulation signal receiver 200b. Further, the demultiplexer 150 outputs another signal (intensity modulation signal) to intensity modulation signal receivers (not shown).

Herein, the phase modulation signal transmitter 200a sends the optical signal subjected to the (CS) RZ-DPSK modulation or (CS) RZ-DQPSK modulation with 40 Gbit/s (specifically, refer to FIGS. 27 to 30), the intensity modulation signal transmitter 300 outputs the optical signal subjected to the NRZ modulation with 10 Gbit/s.

Further, the phase modulation signal receiver 200b is connected to the phase modulation signal transmitter 200a via the multiplexer 140, the transmitting DCF 160, the OADM 130, the optical amplifier 110, the NZ-DSF 100, the DCF 120, and the demultiplexer 150, and performs receiving signal processing of the phase modulation signal from the phase modulation signal transmitter 200a, transmitted by optical repetition (specifically, refer to FIGS. 27 to 30).

The transmitting DCF 160 is a dispersion compensator (typically, dispersion compensating fiber) that compensates for the wavelength dispersion of the optical signal transmitted via the transmission line, similarly to the DCF 120. As shown in FIG. 7, the transmitting DCF 160 is disposed just on the back of the multiplexer 140. Therefore, the accumulated dispersion of the optical signals is temporarily the negative (dispersion compensation is performed at the transmitting terminal and the accumulated dispersion of the optical signals is therefore temporarily the negative).

At this position, the transmitting DCF 160 is disposed. The accumulated dispersion of the optical signals is temporarily the negative, thereby entirely dropping the upper limit of the XPM degradation area.

Figure 8:
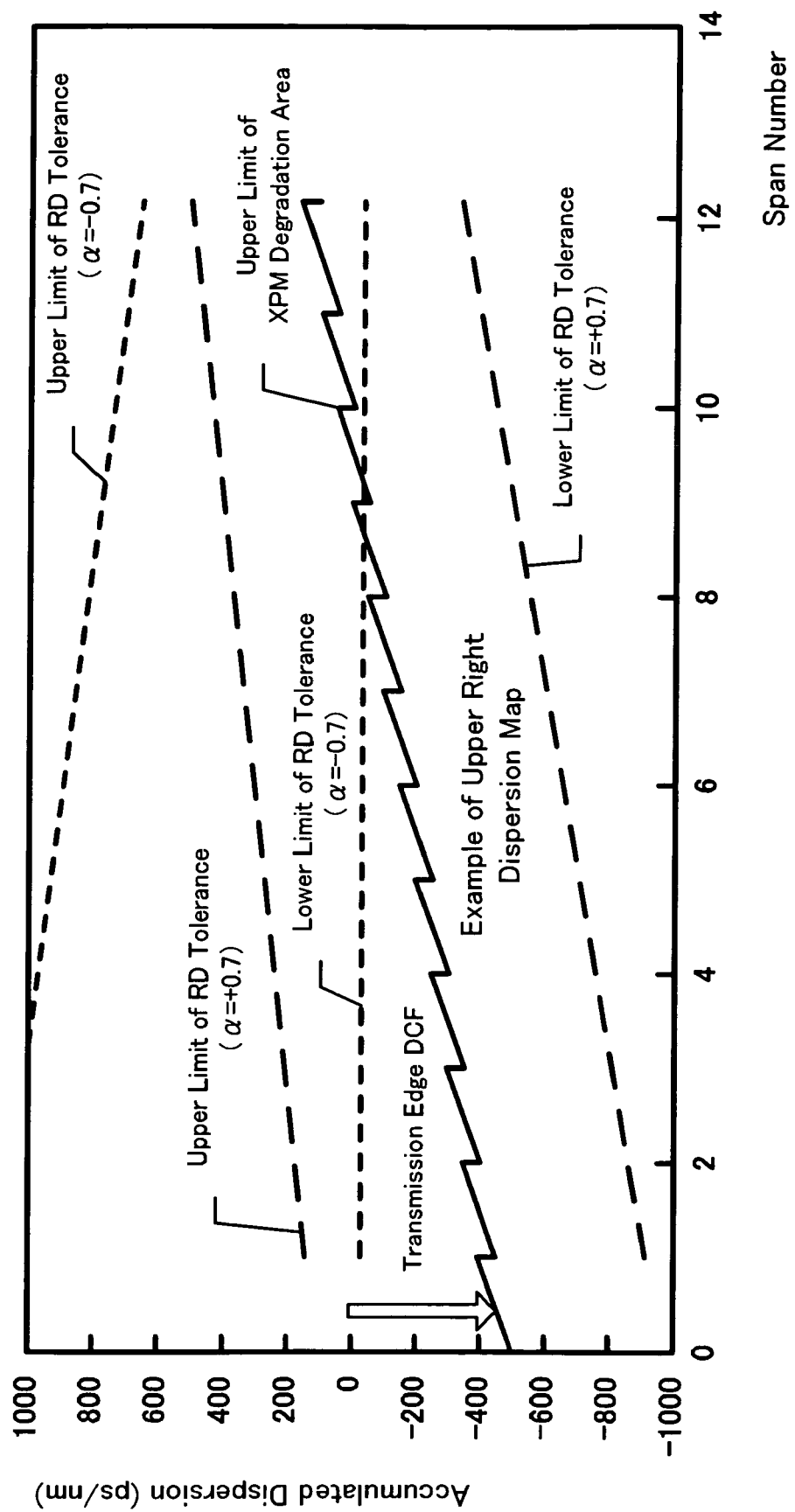
FIG. 8 is a diagram for illustrating the advantages upon setting a transmitting DCF.

FIG. 8 is a diagram for illustrating advantages upon disposing the transmitting DCF 160. Referring to FIG. 8, the transmitting DCF 160 is disposed, thereby increasing the degree of freedom of a value to be set of the in-line amount of dispersion compensation. As a consequence, the wavelength multiplexing transmission system can be structured with less restriction.

Incidentally, with the wavelength multiplexing transmission system according to the first embodiment, a chirping parameterparameter α (parameter indicating the amount of change in wavelength given by a transmitter) of the intensity modulation signal with 10 Gbit/s, output by the intensity modulation signal transmitter 300, is the positive so as to set the accumulated dispersion to a dispersion map with monotonous increase. Referring to FIG. 8, when the chirping parameter α is the positive, the residual dispersion tolerance (RD tolerance) monotonously increases. Incidentally, when the chirping parameter α is the negative, the residual dispersion tolerance monotonously decreases.

Herein, a description will be given of the structure of an optical modulator 310 disposed to the intensity modulation signal transmitter 300.

Figure 9:
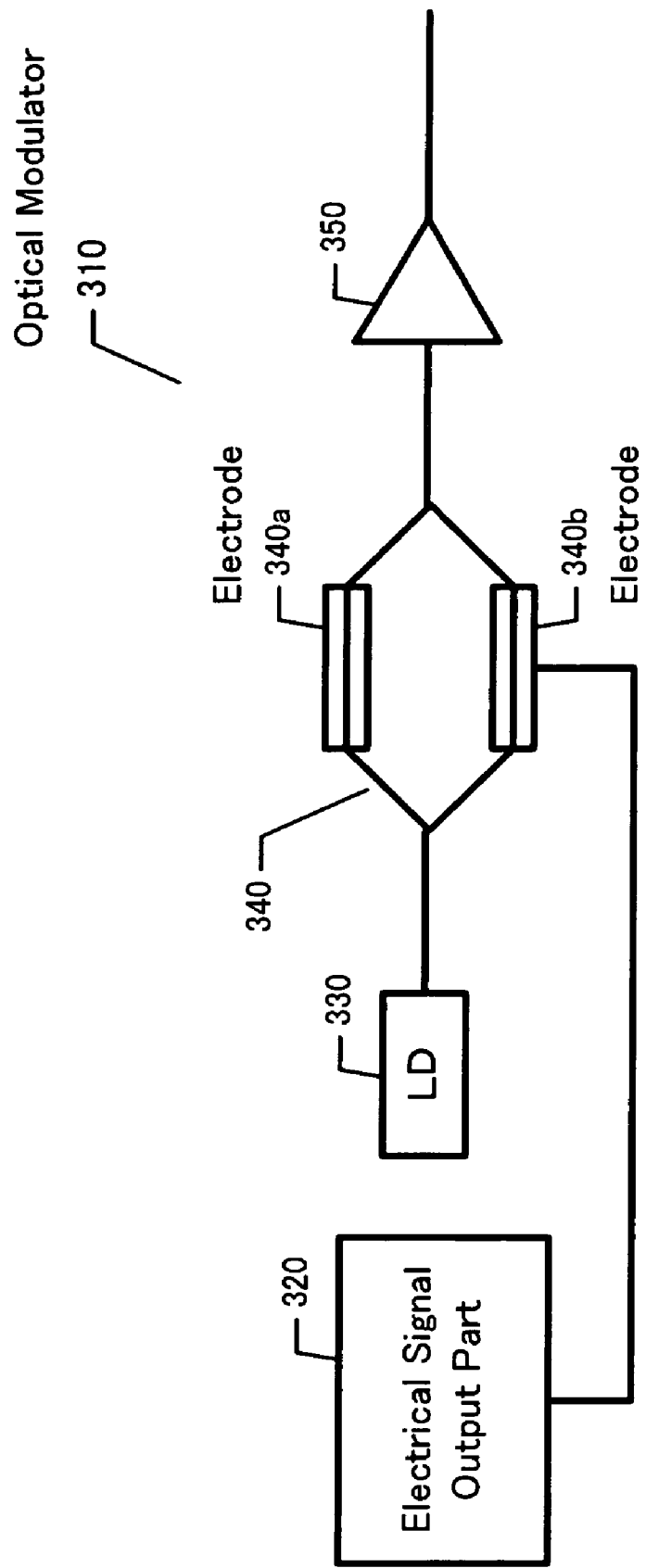
FIG. 9 is a functional block diagram showing the structure of an optical modulator disposed at an intensity modulation signal transmitter.

FIG. 9 is a functional block diagram showing the structure of the optical modulator 310 disposed to the intensity modulation signal transmitter 300. Referring to FIG. 9, the optical modulator 310 comprises: an electrical signal output part 320; an LD (Laser Diode) 330; a Mach-Zehnder interferometer 340 having electrodes 340*a* and 340*b*; and an optical amplifier 350.

Among the components, the electrical signal output part 32 outputs an electrical signal with 10 G (bit/s) to the electrode 340*b*. The electrical signal modulates the intensity of light passing through the electrode 340*b*. The LD 330 outputs the light to the Mach-Zehnder interferometer 340 having the electrodes 340*a* and 340*b*. Voltages are applied to the electrodes 340*a* and 340*b*, thereby modulating the phase of the light passing through the Mach-Zehnder interferometer 340 having the electrodes 340*a* and 340*b*.

The Mach-Zehnder interferometer 340 couples the light passing through the electrodes 340*a* and 340*b*, thereby generating the optical signal having the modulated intensity. After the optical amplifier 350 amplifies the optical signal, the amplified optical signal is input to the multiplexer 140 shown in FIG. 7.

Incidentally, the chirping parameter α of the optical modulator 310 is expressed by the following expression.

$$\alpha = 2 \frac{\frac{d\phi}{dt}}{\frac{1}{p}\frac{dp}{dt}} \quad (3)$$

In the expression (3), p denotes the optical intensity, dφ/dt denotes the ratio of the change in optical phase in accordance with the change due to the time elapse, and dp/dt denotes the ratio of the change in optical intensity in accordance with the change due to the time elapse. A control part (not shown) in the intensity modulation signal transmitter 300 controls a bias voltage of the optical modulator 310 so as to set the chirping parameter to the positive.

By setting, to the positive, the chirping parameter of the intensity modulation signal with 10 Gbit/s output by the intensity modulation signal transmitter 300, the waveform is compressed by the negative residual dispersion in the short-distance transmission of the optical signal. As a consequence, the best status is obtained. The residual dispersion is the positive by self-phase modulation (SPM) in the long-distance transmission of the optical signal. Therefore, the residual dispersion tolerance of the intensity modulation signal monotonously increases with respect to the transmission distance. The residual dispersion tolerance monotonously increases, and the area of the small XPM-degradation is therefore widened and the degree of freedom of the value to be set of the amount of in-line dispersion compensation is further increased. Accordingly, the wavelength multiplexing transmission system is structured with less restriction.

As mentioned above, with the wavelength multiplexing transmission system according to the first embodiment, the amount of in-line residual dispersion (the amount of residual dispersion generated by the transmission line (NZ-DSF 100) every all spans and the DCF 120) is adjusted so as to satisfy the expression (2). Even if performing the transmitting processing of the optical signal mixedly having the phase modulation signal and the intensity modulation signal, it is possible to prevent the waveform degradation of the phase modulation signal.

Further, with the wavelength multiplexing transmission system according to the first embodiment, the transmitting DCF 160 is disposed just on the back of the multiplexer 140, and the accumulated dispersion of the optical signal is thus temporarily the negative. Accordingly, the area of the large XPM-degradation entirely drops, and the degree of freedom to be set of the amount of in-line dispersion compensation, and the wavelength multiplexing transmission system is structured with less restriction.

Furthermore, with the wavelength multiplexing transmission system according to the first embodiment, the chirping parameter of the intensity modulation signal, output by the intensity modulation signal transmitter 300, is set to the positive. Accordingly, the residual dispersion tolerance monotonously increases, and the wavelength multiplexing transmission system is structured with less restriction.

Incidentally, as one example according to the first embodiment, the phase modulation signal transmitter 200*a* outputs the phase modulation signal with 40 Gbit/s. However, the bit rate is not limited to 40 Gbit/s, and may output, e.g., a phase modulation signal with N (where N is a positive integer) Gbit/s. Similarly, as another example according to the first embodiment, the intensity modulation signal transmitter 300 outputs the intensity modulation signal with 10 Gbit/s. However, the bit rate is not limited to 10 G bit/s, and may output, e.g., an intensity modulation signal with N (where N is a positive integer) Gbit/s.

Second Embodiment

Next, a description will be given of outline and features of a wavelength multiplexing transmission system according to the second embodiment of the present art. With the wavelength multiplexing transmission system according to the second embodiment, in the wavelength multiplexing transmission by assigning the phase modulation signal and the intensity modulation signal to a plurality of optical wavelengths, a guard band serving as a band where the optical wavelength is not set is disposed between the optical wavelength to which the phase modulation signal is assigned and the optical wavelength to which the intensity modulation signal is assigned.

By setting the guard band as mentioned above, it is possible to reduce the influence from the intensity modulation signal to the phase modulation signal. Alternatively, it is possible to reduce the range of the in-line residual dispersion, within which the XPM degradation is large.

Figure 10:
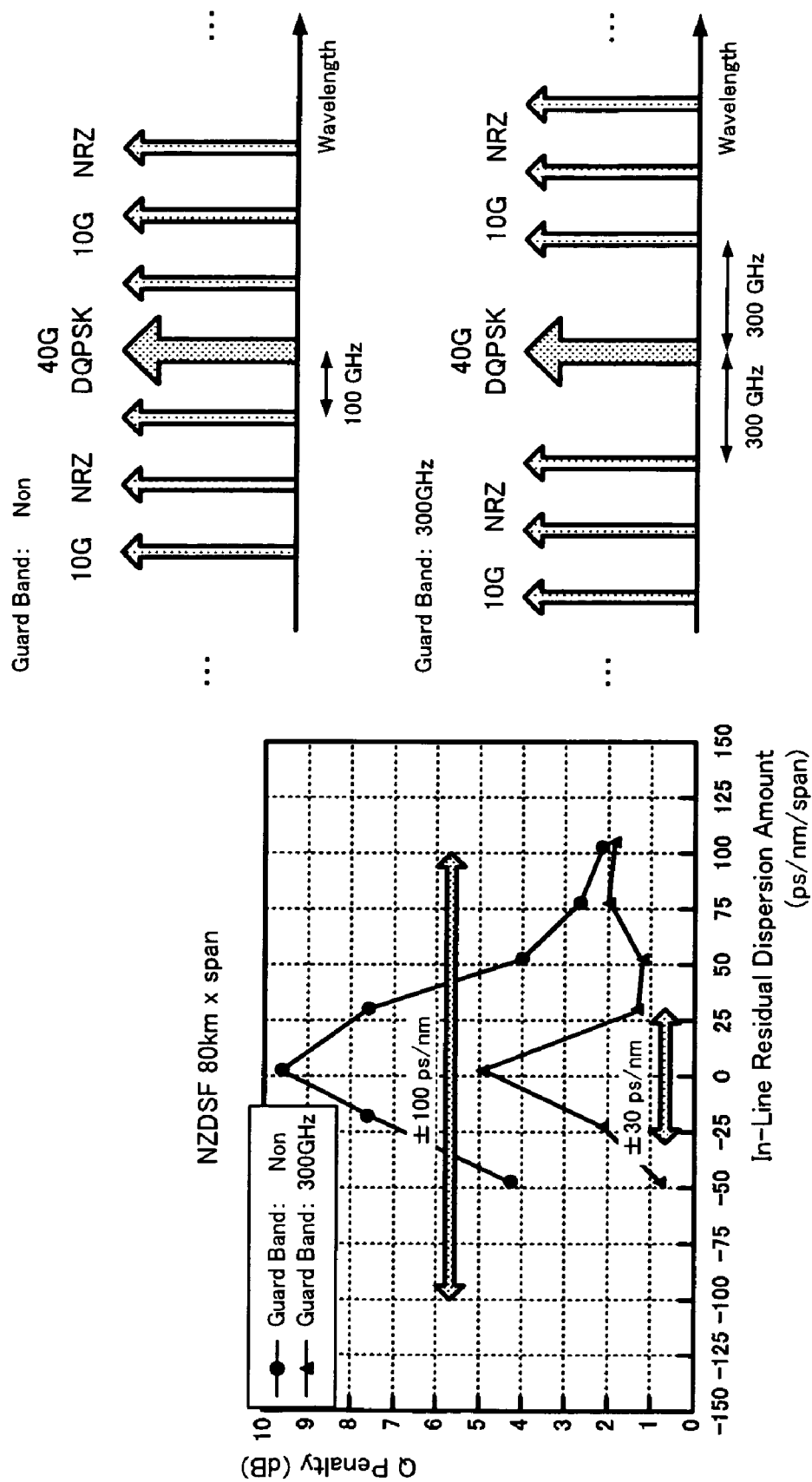
FIG. 10 is a diagram showing a relationship between a guard band and a range of the in-line residual dispersion.

FIG. 10 is a diagram showing a relationship between the guard band and the range of the in-line residual dispersion. Referring to FIG. 10, without arranging the guard band (the wavelength interval between the phase modulation signal and the intensity modulation signal is 100 GHz), the Q penalty has a predetermined value or more. When the range of the in-line residual dispersion is −100 (ps/nm) to 100 (ps/nm), the XPM degradation is large.

On the other hand, with arranging the guard band (the wavelength interval between the phase modulation signal and the intensity modulation signal is 300 GHz), the Q penalty has a predetermined value or more. When the range of the in-line residual dispersion is from 30 (ps/nm) to −30 (ps/nm), the XPM degradation is large.

Figure 11:
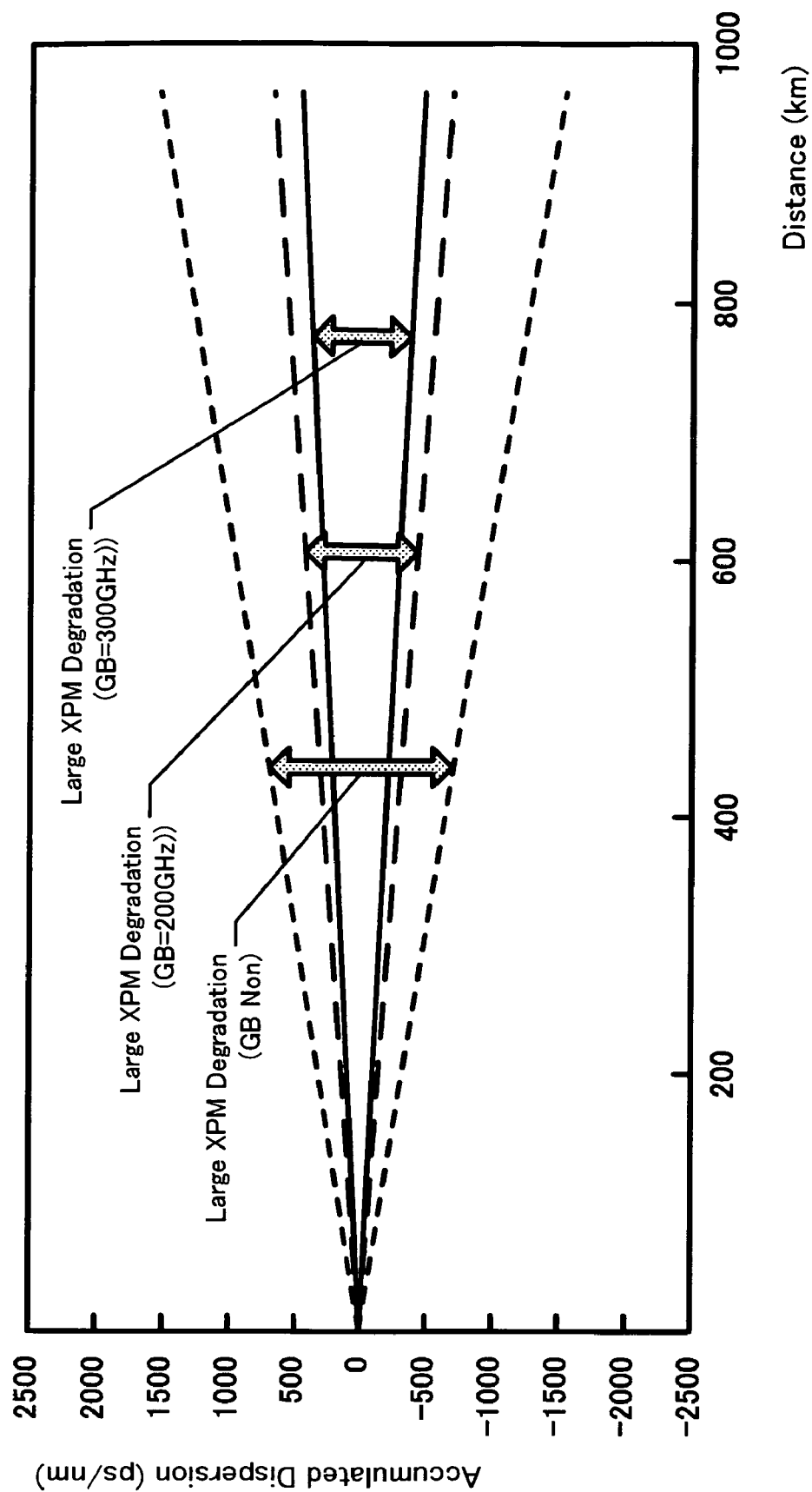
FIG. 11 is a diagram showing a relationship between the guard band and an area of large XPM-degradation.

FIG. 11 is a diagram showing a relationship between the guard band and the area having the large XPM-degradation.

Referring to FIG. 11, obviously, as the width of the guard band is larger, the area of the large XPM-degradation is narrower.

Next, a description will be given of the structure of the wavelength multiplexing transmission system according to the second embodiment.

Figure 12:
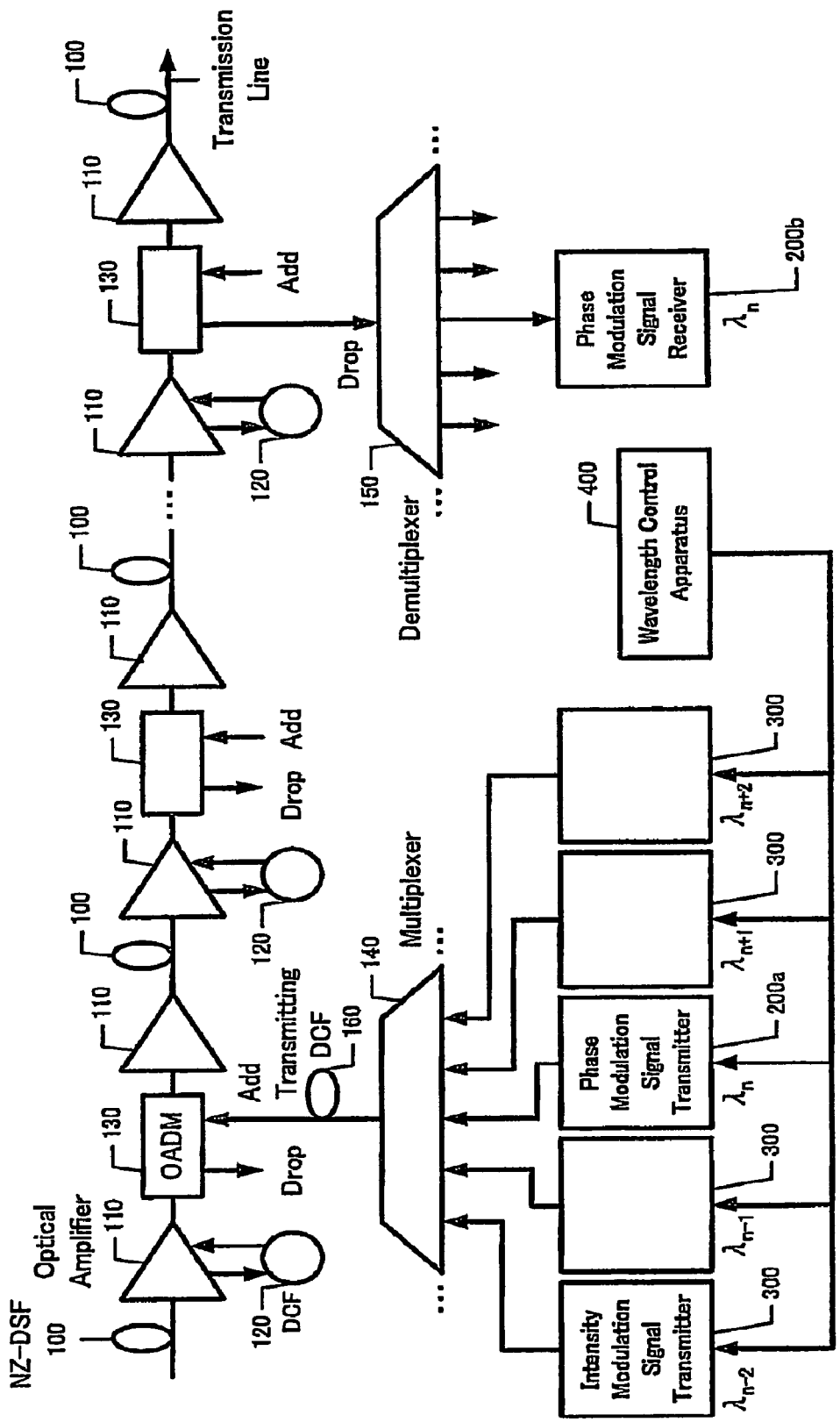
FIG. 12 is a diagram showing the structure of a wavelength multiplexing transmission system according to the second embodiment of the present art.

FIG. 12 is a diagram showing the structure of the wavelength multiplexing transmission system according to the second embodiment. Referring to FIG. 12, the wavelength multiplexing transmission system comprises: the NZ-DSF 100; the optical amplifier 110; the DCF 120; the OADM 130; the multiplexer 140; the demultiplexer 150; the transmitting DCF 160; the phase modulation signal transmitter 200a; the phase modulation signal receiver 200b; the intensity modulation signal transmitter 300; and a wavelength control apparatus 400.

Among the components, a description of the NZ-DSF 100, the optical amplifier 110, the DCF 120, the OADM 130, the multiplexer 140, the demultiplexer 150, the transmitting DCF 160, the phase modulation signal transmitter 200a, the phase modulation signal receiver 200b, and the intensity modulation signal transmitter 300 is similar to the description of the NZ-DSF 100, the optical amplifier 110, the DCF 120, the OADM 130, the multiplexer 140, the demultiplexer 150, the transmitting DCF 160, the phase modulation signal transmitter 200a, the phase modulation signal receiver 200b, and the intensity modulation signal transmitter 300. Herein, the components are designated by the same reference numerals and the description is omitted.

The wavelength control apparatus 400 controls the phase modulation signal transmitter 200a and the intensity modulation signal transmitter 300, thereby setting the guard band between the optical wavelength to which the phase modulation signal is assigned and the optical wavelength to which the intensity modulation signal is assigned.

Figure 13:
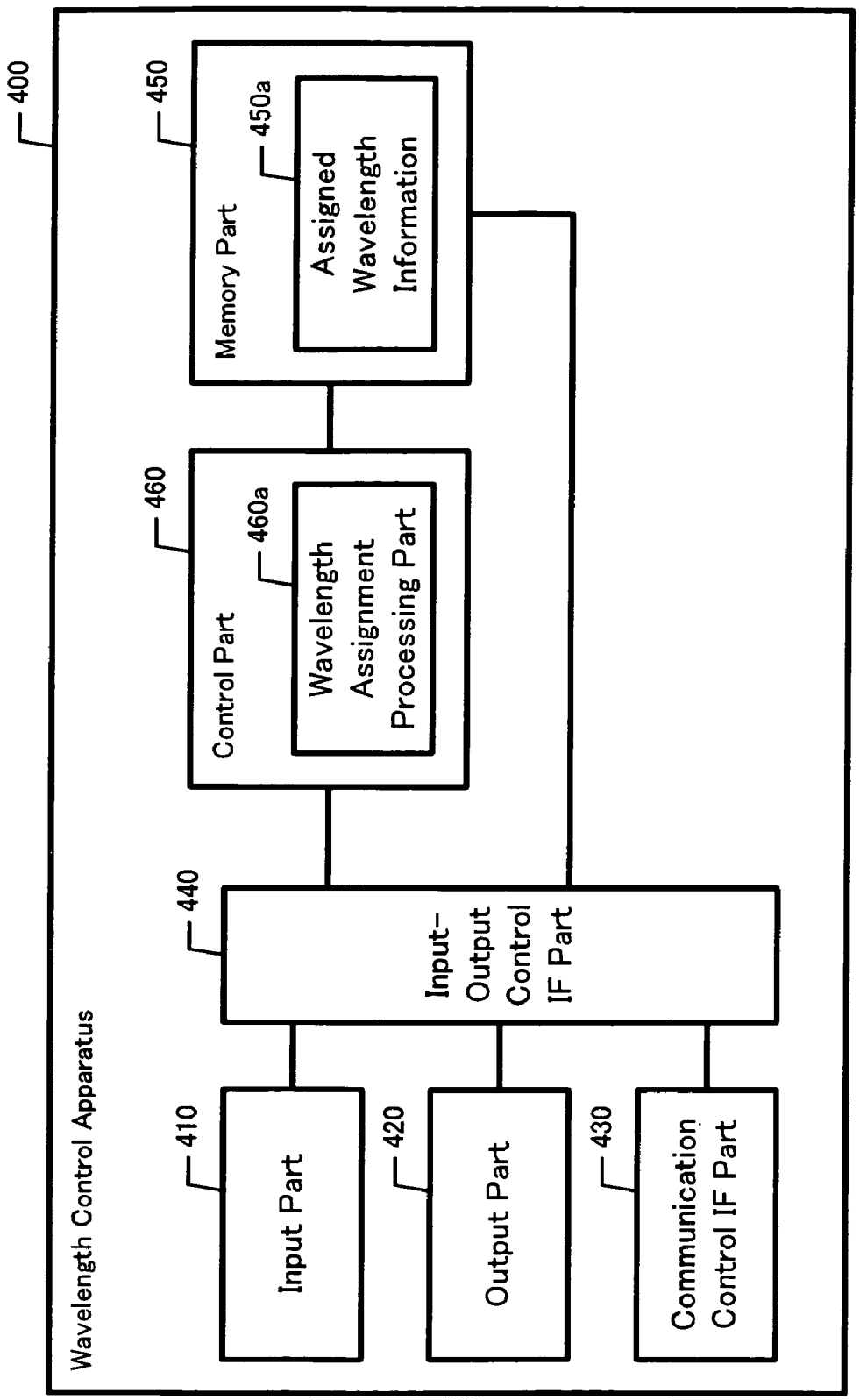
FIG. 13 is a functional block diagram showing the structure of a wavelength control apparatus.

FIG. 13 is a functional block diagram showing the structure of the wavelength control apparatus 400. Referring to FIG. 13, the wavelength control apparatus 400 comprises: an input part 410; an output part 420; a communication control IF part 430; an input/output control IF part 440; a memory part 450; and a control part 460.

Among them, the input part 410 is input means that inputs various information, and comprises a keyboard, a mouse, and a microphone. Incidentally, a monitor (output part 420), which will be described later, realizes a pointing device function in cooperation with the mouse.

The output part 420 is output means that outputs various information, and comprises a monitor (or display or touch panel). Further, the communication control IF part 430 is means that executes data communication, mainly between the phase modulation signal transmitter 200a and the intensity modulation signal transmitter 300 by using a predetermined communication protocol.

The input/output control IF part 440 is means that controls the input/output of data from/to the input part 410, the output part 420, the communication control IF part 430, the memory part 450, and the control part 460.

The memory part 450 is memory means (storing means) that stores data and a program necessary for various processing with the control part 460. In particular, as the close correlation of the present art, the memory part 450 includes assigned wavelength information 450a, as shown in FIG. 13.

The assigned wavelength information 450a stores a wavelength assigned to the signals output by the phase modulation signal transmitter 200a and the intensity modulation signal transmitter 300.

FIG. 14 is a diagram showing an example of data structure of the assigned wavelength information 450a. Referring to FIG. 14, the assigned wavelength information 450a correlates transmitter identification information for identifying the transmitters (the phase modulation signal transmitter 200a and the intensity modulation signal transmitter 300) with the information of the wavelengths assigned to the transmitters, and stores the correlated information.

Upon setting the guard band, the administrator of the wavelength multiplexing transmission system sets the values of assigned wavelength information 450a so that the wavelength interval between the phase modulation signal output by the phase modulation signal transmitter 200a and the intensity modulation signal output by the intensity modulation signal transmitter 300 is apart by a predetermined value via the input part 410. For example, as described with reference to FIG. 10, upon setting the guard band, the administrator sets the assigned wavelength information 450a so that the wavelength interval between the phase modulation signal and the intensity modulation signal is apart by 300 GHz.

The control part 460 has an internal memory for storing a program for prescribing various processing sequences and control data, and is control means that executes various processing by the memory. In particular, as a close correlation of the present art, as shown in FIG. 13, the control part 460 has a wavelength assignment processing part 460a.

The wavelength assignment processing part 460a is means that outputs the information on the optical wavelength to which the optical signal can be assigned on the basis of the assigned wavelength information 450a to the transmitters (the phase modulation signal transmitter 200a and the intensity modulation signal transmitter 300).

Incidentally, the method for disposing the guard band between the phase modulation signal and the intensity modulation signal is not limited to the method shown in FIG. 10.

Figure 15:
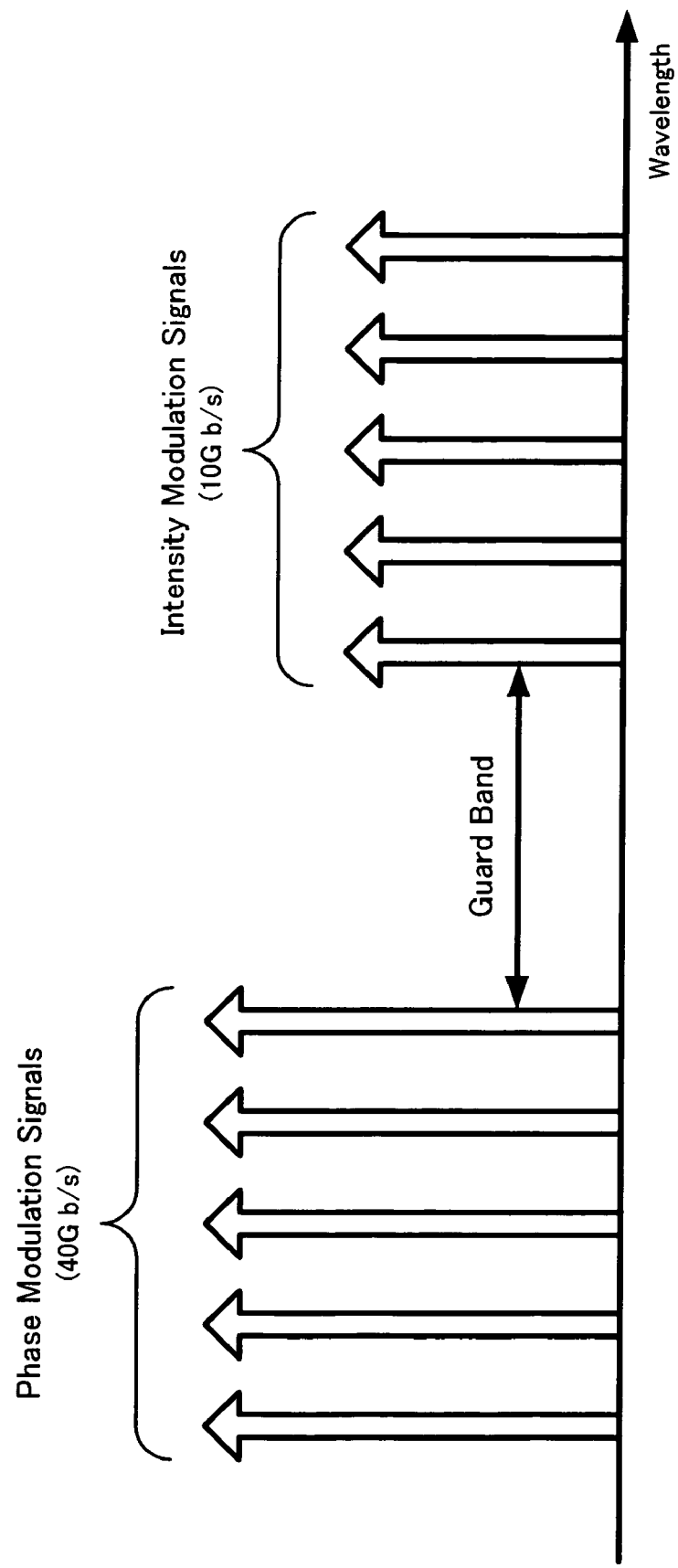
FIG. 15 is a first diagram showing a setting method of another guard band.
Figure 16:
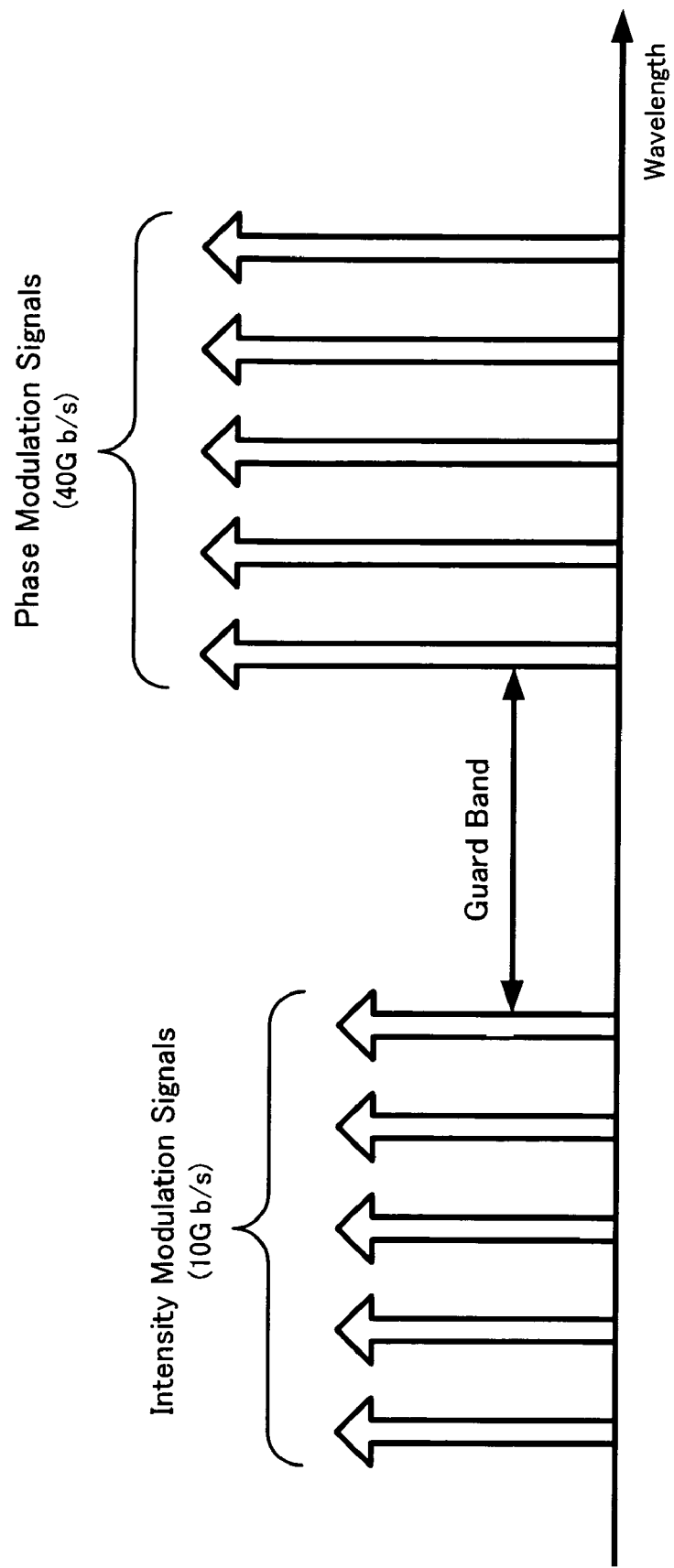
FIG. 16 is a second diagram showing the setting method of another guard band.

FIGS. 15 and 16 are diagrams showing another method for setting the guard band.

Referring to FIG. 15, the phase modulation signal may be assigned to an area having a short wavelength, and the intensity modulation signal may be assigned to an area having a long wavelength at a predetermined wavelength interval (e.g., 300 GHz or 600 GHz) from the phase modulation signal. That is, the phase modulation signal is assigned to the area having the short wavelength and the intensity modulation signal is assigned to the area having the long wavelength, thereby disposing the guard band between the phase modulation signal and the intensity modulation signal.

Further, referring to FIG. 16, the intensity modulation signal may be assigned to an area having a short wavelength and the phase modulation signal may be assigned to an area having a long wavelength at a predetermined wavelength interval (e.g., 300 GHz or 600 GHz) from the intensity modulation signal. That is, the intensity modulation signal is assigned to the area having the short wavelength and the phase modulation signal is assigned to the area having the long wavelength, thereby disposing the guard band between the phase modulation signal and the intensity modulation signal.

The wavelength control apparatus 400 sets the guard bands as shown in FIGS. 15 and 16, thereby reducing an area of an unavailable optical wavelength and assigning the signals to a wider area.

As mentioned above, with the wavelength multiplexing transmission system according to the second embodiment, the wavelength control apparatus 400 sets the guard band, and further sets the wavelength assigned to the phase modulation signal output from the phase modulation signal transmitter 200a and the intensity modulation signal output from the intensity modulation signal transmitter 300, in the wavelength multiplexing transmission, thereby reducing the influence from the intensity modulation signal to the phase modulation signal. Alternatively, it is possible to reduce the range of the in-line residual dispersion having large XPM-degradation.

Incidentally, the wavelength control apparatus 400 according to the second embodiment sets the guard band, thereby reducing the influence from the intensity modulation to the phase modulation signal. However, it is possible to reduce the influence from the intensity modulation signal to the phase modulation signal by assigning the phase modulation signal and the intensity modulation signal to proper wavelength areas on the basis of characteristics of the in-line residual dispersion for the wavelength.

Figure 17:
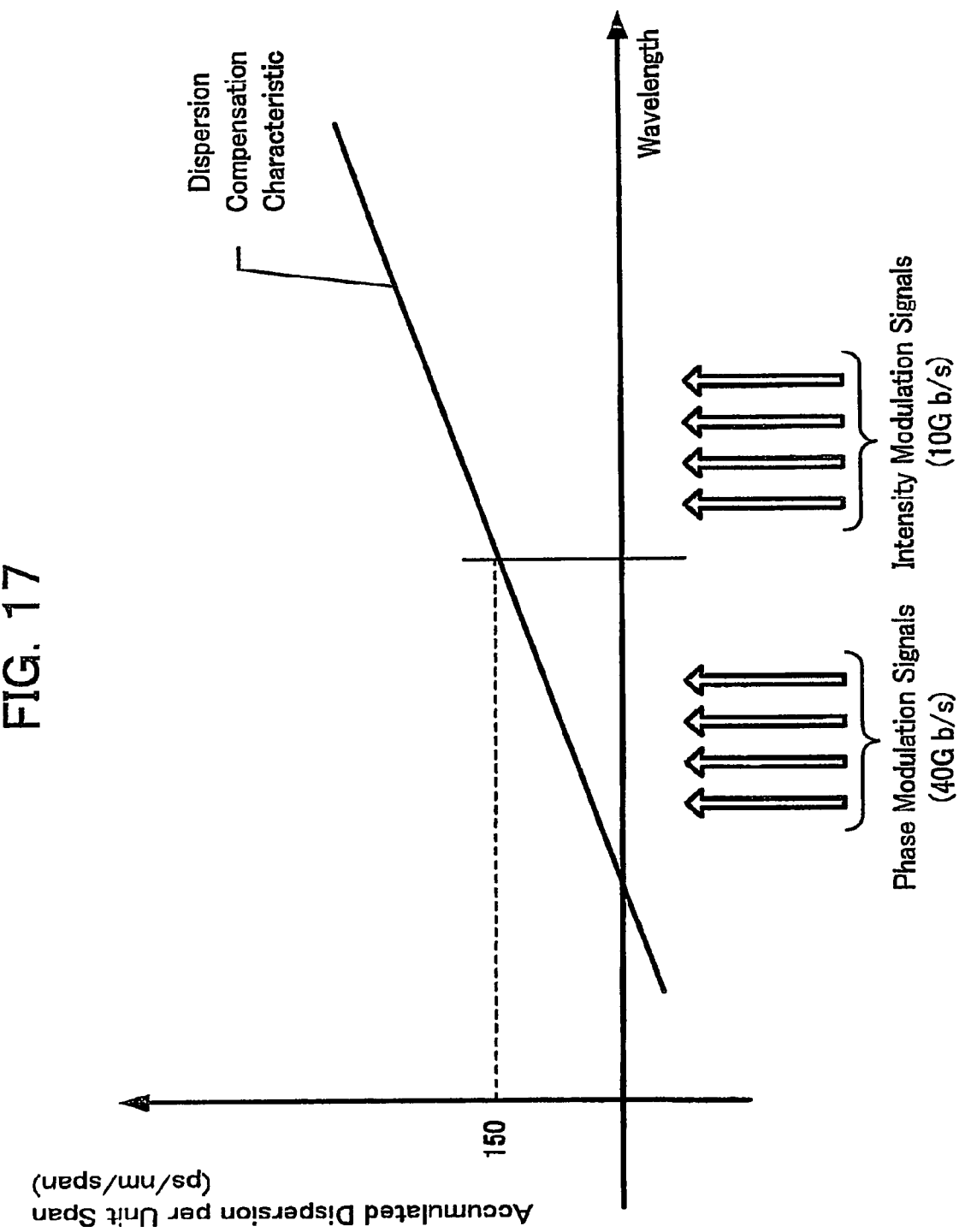
FIG. 17 is a diagram for illustrating a dispersion compensating characteristic of NZ-DSF.

FIG. 17 is a diagram for illustrating the dispersion compensating characteristic of NZ-DSF. Referring to FIG. 17, the NZ-DSF has the amount of in-line dispersion compensation of 0 (ps/nm/span) for a predetermined wavelength. However, after the predetermined wavelength, the wavelength increase raises the amount of in-line dispersion compensation.

For example, the intensity modulation signal is assigned to a wavelength area having the amount of in-line dispersion compensation of 150 (ps/nm/span) or more, corresponding to the allowable range of the value of the Q penalty (refer to FIG. 2), and the phase modulation signal is assigned to a wavelength area having the amount of in-line dispersion compensation of 150 (ps/nm/span) or less, thereby reducing the influence from the intensity modulation signal to the phase modulation signal.

In this case, the administrator of the wavelength multiplexing transmission system may set the assigned wavelength information 450a of the wavelength control apparatus 400 so that the intensity modulation signal is assigned to the wavelength area having the amount of in-line dispersion compensation of 150 (ps/nm/span) or more and the phase modulation signal is assigned to the wavelength area having the amount of in-line dispersion compensation of 150 (ps/nm/span) or less.

Third Embodiment

Next, a description will be given of outline and features of a wavelength multiplexing transmission system according to the third embodiment. With the wavelength multiplexing transmission system according to the third embodiment, dispersion compensators (DCFs) are concentratedly arranged every several spans, and the number of times for setting the accumulated dispersion to approximately the zero is reduced.

As mentioned above, the number of times for setting the accumulated dispersion to approximately the zero is reduced, thereby reducing the influence from the intensity modulation signal to the phase modulation signal. Therefore, the XPM penalty is reduced. However, if excessively increasing the number of spans without arrangement of the DCF, the value of the accumulated dispersion is too large depending on the position where the OADM adds or drops the optical signal, and the optical signal cannot be thus transmitted. Therefore, a proper compensating interval is necessary.

Figure 18:
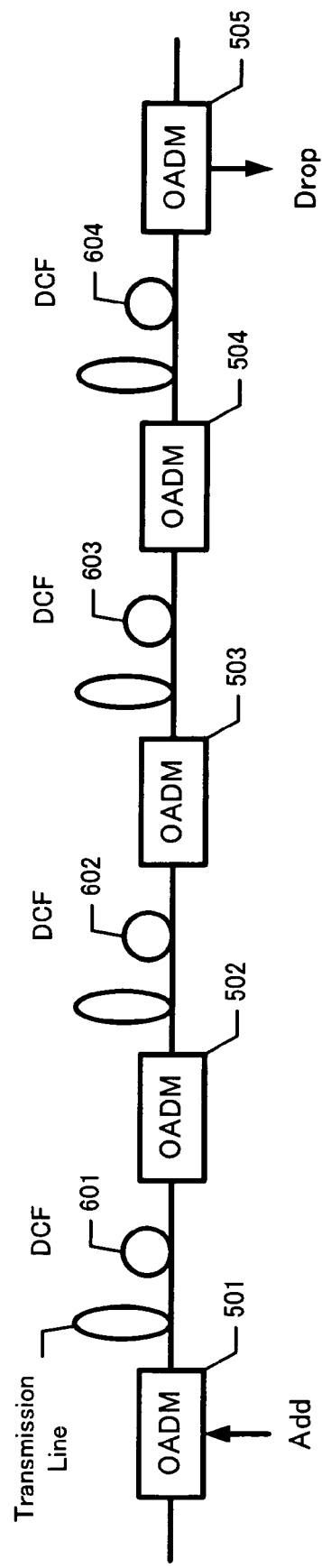
FIG. 18 is a diagram for illustrating the disporting arrangement of DCFs in a conventional wavelength multiplexing transmission system.

FIG. 18 is a diagram for illustrating the disporting arrangement of the DCFs in a conventional wavelength multiplexing transmission system. Referring to FIG. 18, DCFs 601 to 604 are set to the conventional wavelength multiplexing transmission system every all spans. Therefore, the number of times for setting the accumulated dispersion to approximately the zero increases.

Figure 19:
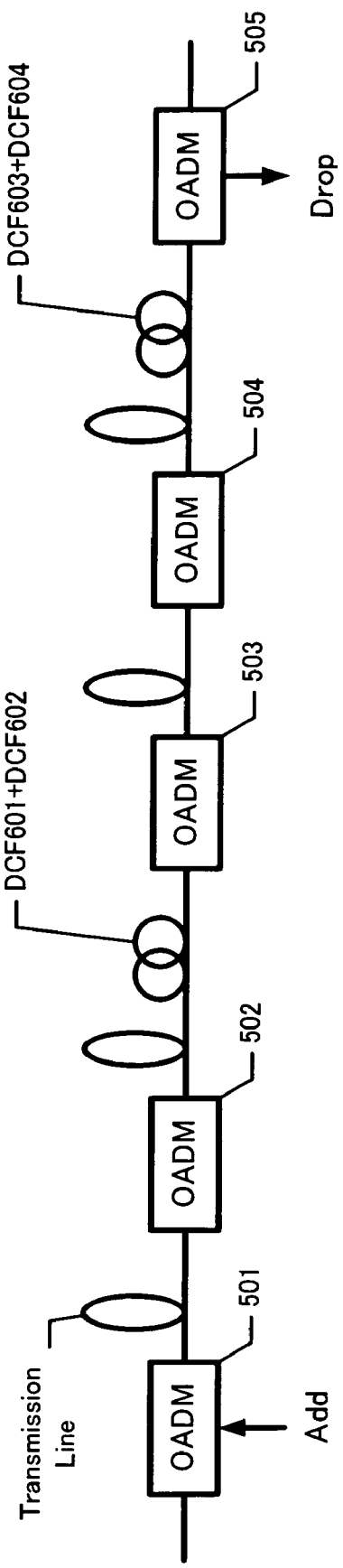
FIG. 19 is a first diagram showing the disporting arrangement of DCFs in a wavelength multiplexing transmission system according to the third embodiment of the present art.
Figure 20:
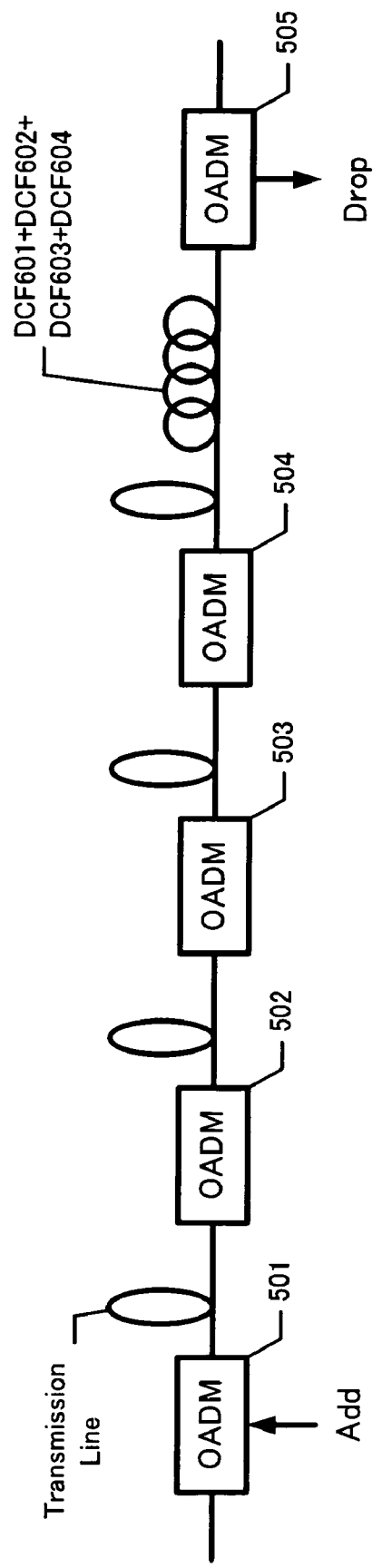
FIG. 20 is a second diagram showing the disporting arrangement of DCFs in the wavelength multiplexing transmission system according to the third embodiment of the present art.

FIGS. 19 and 20 are diagrams showing the concentrated arrangement of the DCFs in the wavelength multiplexing transmission system according to the third embodiment. Incidentally, OADMs 501 to 505 and the DCFs 601 to 604 shown in FIGS. 19 and 20 correspond to the OADMs 130 and the DCFs 120 shown in FIG. 7, respectively.

Referring to FIG. 19, the DCFs 601 and 602 are arranged between the OADMs 502 and 503, the DCFs 603 and 604 are arranged between the OADMs 504 and 505, and the dispersion compensation is performed every 2 spans. Referring to FIG. 20, the DCFs 601 to 604 are arranged between the OADMs 504 and 505, and the dispersion compensation is performed every 4 spans.

Figure 21:
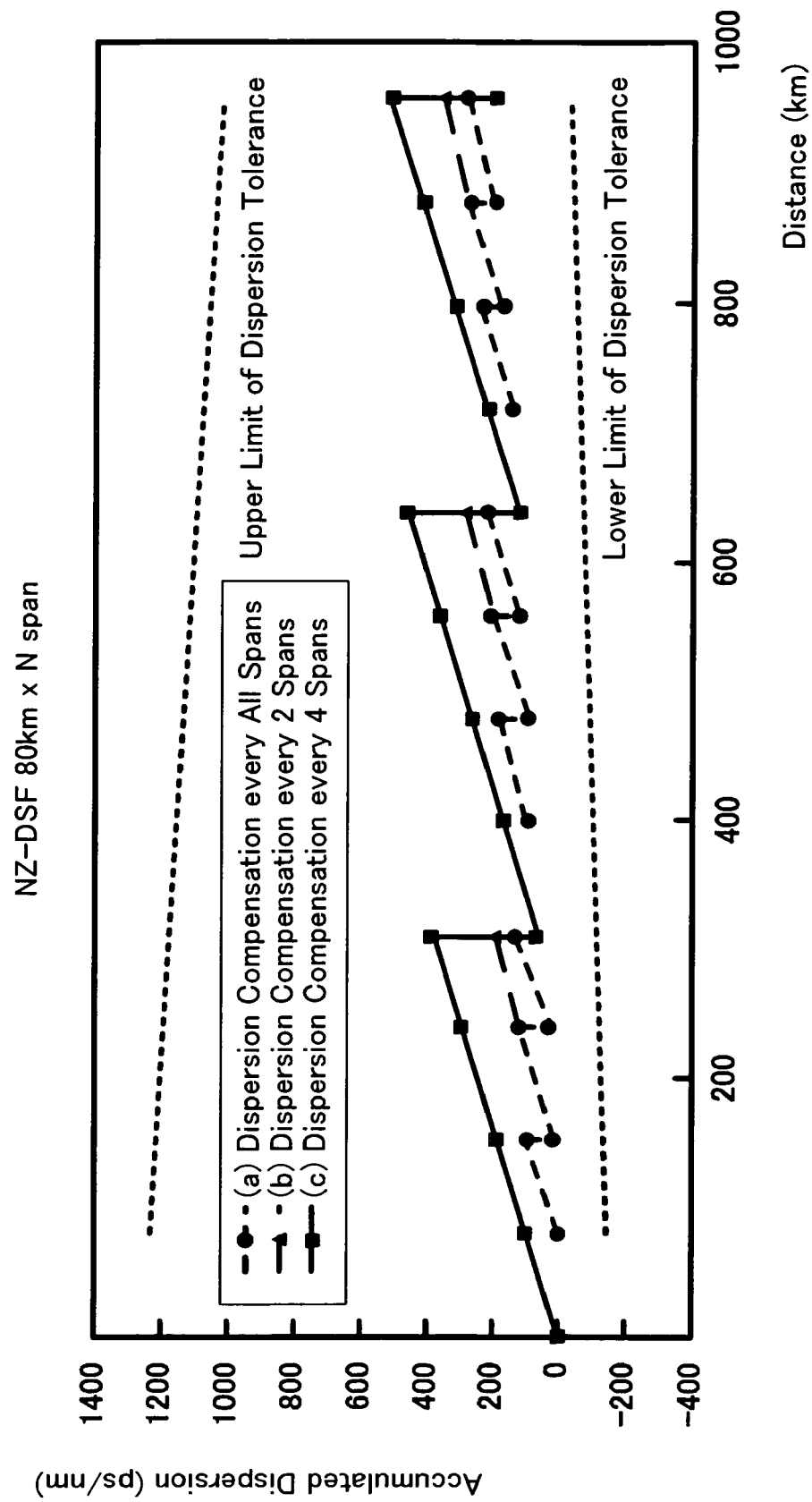
FIG. 21 is a diagram showing a relationship between the distance and the accumulated dispersion in the dispersion compensation shown in FIGS. 18 to 20.

FIG. 21 is a diagram showing a relationship between the distance and the accumulated dispersion in the dispersion compensation shown in FIGS. 18 to 20. Referring to FIG. 21, obviously, the number of times for setting the accumulated dispersion to approximately the zero in the case of the dispersion compensation every 2 spans or every 4 spans is smaller than that in the case of the accumulated dispersion every all spans.

Figure 22:
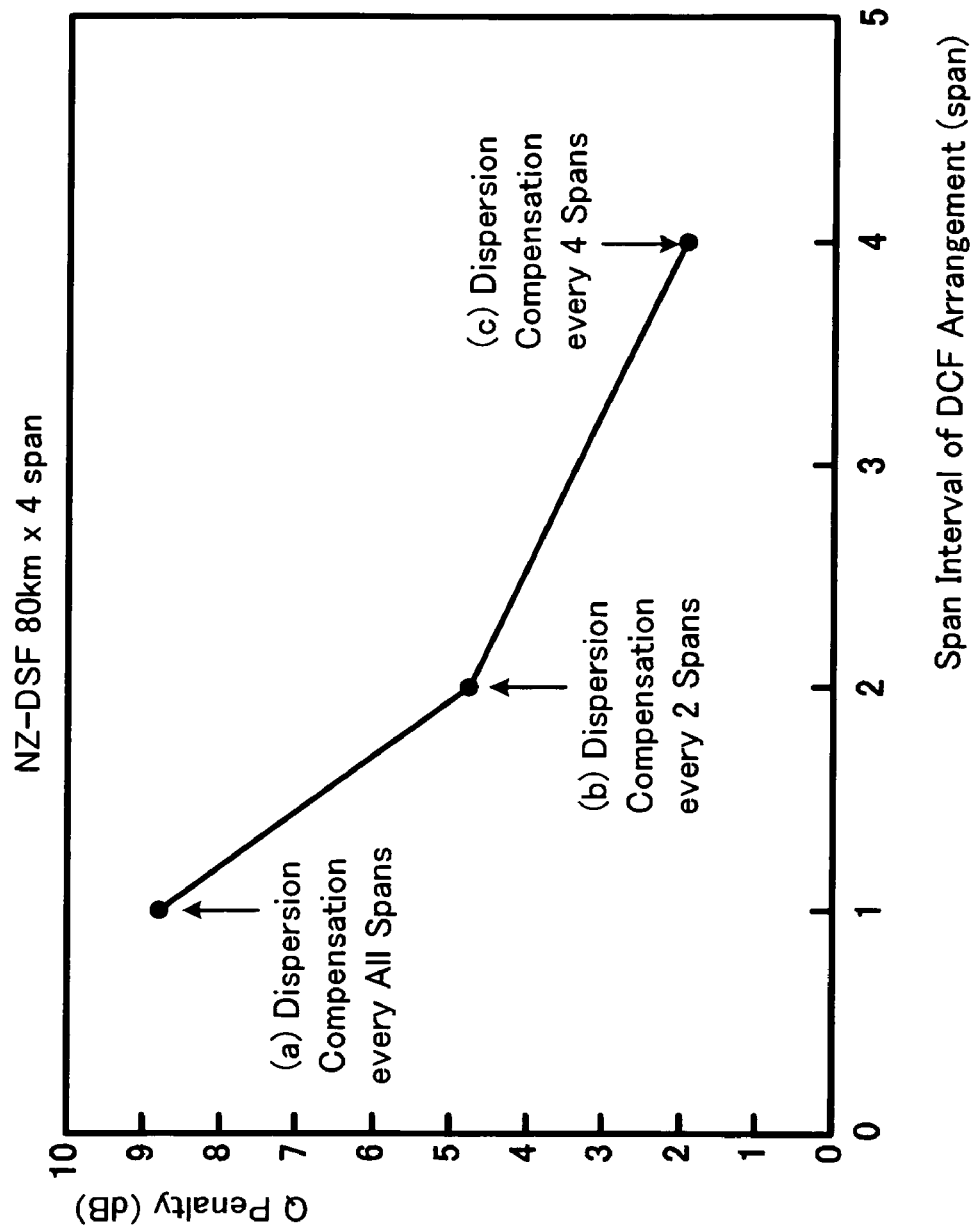
FIG. 22 is a diagram showing a relationship between the method of the dispersion compensation and the Q penalty shown in FIGS. 18 to 20.
Figure 24:
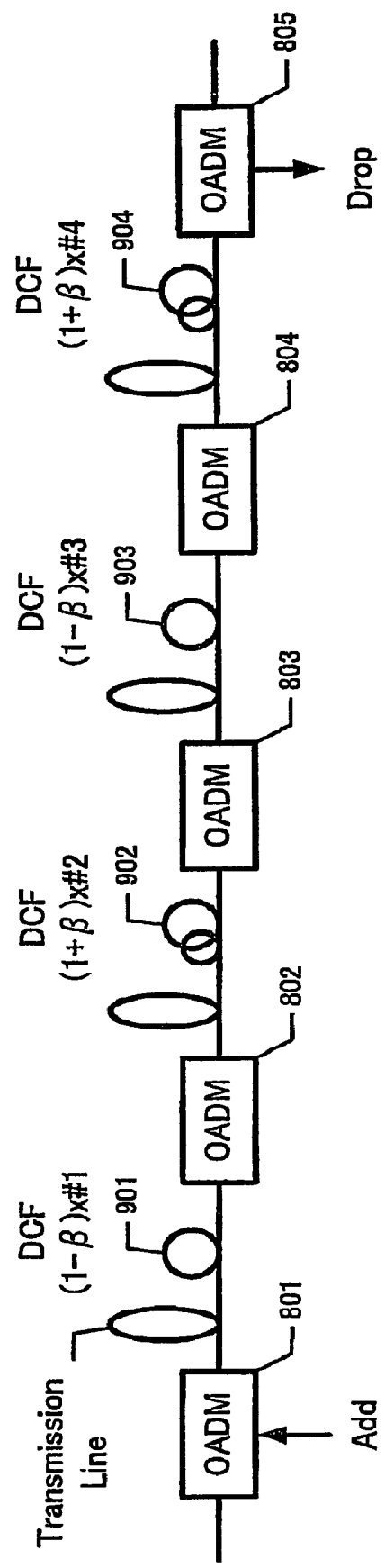
FIG. 24 is a diagram showing the disporting arrangement of DCFs in a wavelength multiplexing transmission system according to the fourth embodiment of the present art.

FIG. 22 is a diagram showing a relationship between the methods of the dispersion compensation shown in FIGS. 18 to 20 and the Q penalty. Referring to FIG. 24, obviously, the value of the Q penalty in the dispersion compensation every 2 spans or every 4 spans is smaller than that in the dispersion compensation every all spans. Because the dispersion compensation is performed every plural spans, the number of times for setting the accumulated dispersion to the zero is reduced (refer to FIG. 21), and the number of times for imposing the penalty to the phase modulation by the intensity modulation signal is decreased.

As mentioned above, with the wavelength multiplexing transmission system according to the third embodiment, the dispersion compensators (DCFs) are concentratedly arranged every several spans, and the number of times for setting the accumulated dispersion to approximately the zero is reduced. Therefore, it is possible to reduce the number of times for imposing the penalty to the phase modulation signal by the intensity modulation signal, thereby preventing the XPM degradation.

Incidentally, with wavelength multiplexing transmission system according to the third embodiment, the DCFs are concentratedly arranged between the OADMs. However, as shown in FIG. 23, the DCFs 601 to 605 are arranged between in-line amplifiers ILAs 701 to 704, thereby obtaining the same advantages.

Figure 23:
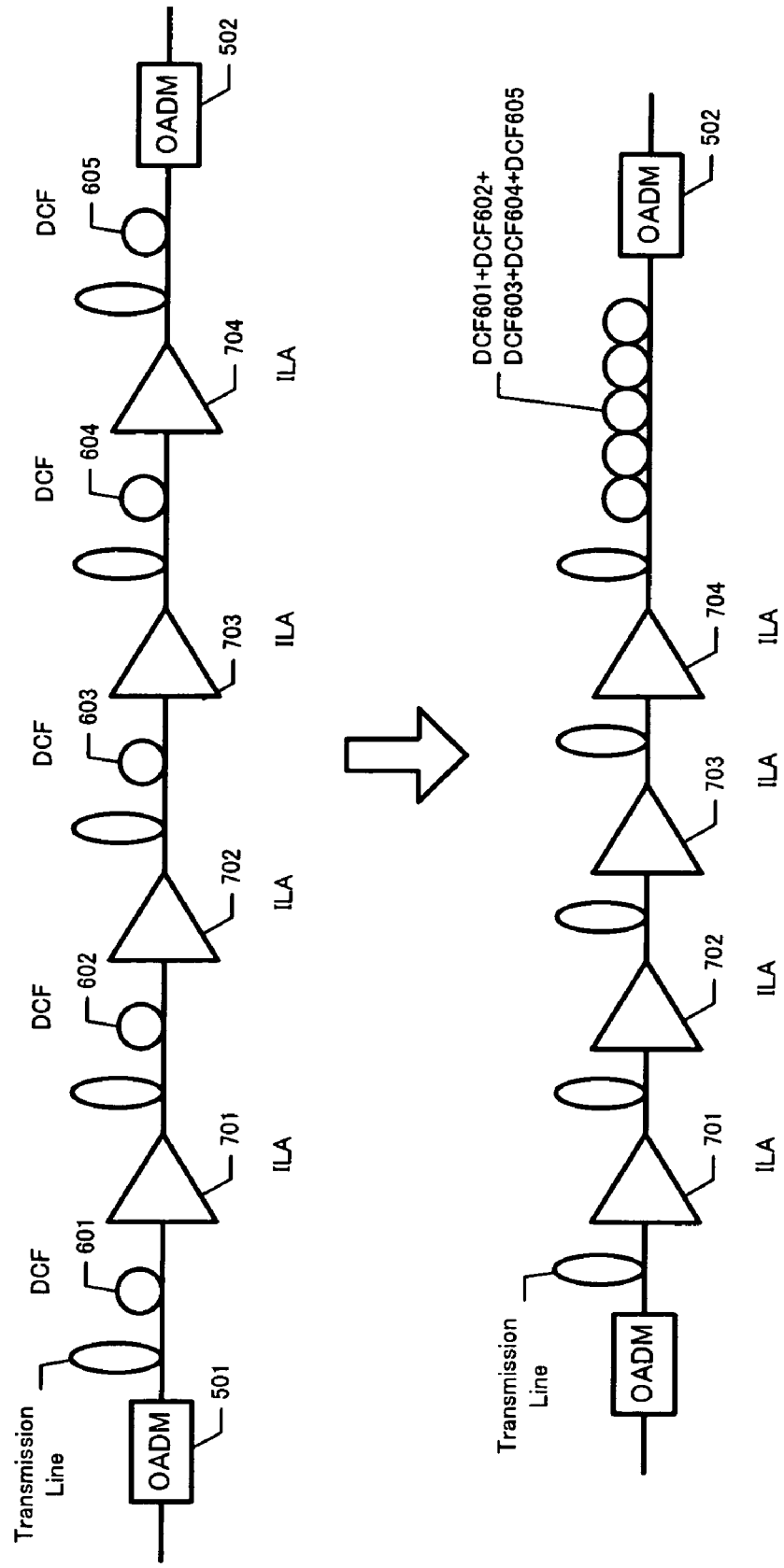
FIG. 23 is a diagram showing an example of the wavelength multiplexing transmission system in which DCF is arranged concentratedly between ILAs.

FIG. 23 is a diagram showing an example of the wavelength multiplexing transmission system having concentratedly the DCFs between the ILAs.

In the example shown in FIG. 23, the DCFs 601 to 605 are concentratedly arranged on the back of the ILA 704. The ILA 704 is different from the OADMs 501 to 505 in the wavelength multiplexing transmission system shown in FIGS. 17 to 19, and the optical signal does not need to be added or dropped. Accordingly, there are not any problems even if increasing the value of the accumulated dispersions amount between the ILAs. Therefore, the span interval for arranging the DCFs can be increasingly set, and the XPM degradation can be suppressed.

Fourth Embodiment

Next, a description will be given of outline and features of a wavelength multiplexing transmission system according to the fourth embodiment of the present art. With the wavelength multiplexing transmission system according to the fourth embodiment, the ratio of dispersion compensation using the DCFs is set to be periodically changed (the DCFs are non-equally arranged), and the number of times for setting the accumulated dispersion to approximately the zero is reduced.

As mentioned above, the number of times for setting the accumulated dispersion to approximately the zero is reduced, thereby reducing the number of times for imposing the penalty to the phase modulation signal by the intensity modulation signal and further the XPM penalty.

FIG. 24 is a diagram showing the disporting arrangement of the DCFs in the wavelength multiplexing transmission system. OADMs 801 to 805 and DCFs 901 to 904 shown in FIG. 24 correspond to the OADMs 130 and the DCFs 120 shown in FIG. 7. Referring to FIG. 24, the amount of dispersion compensation on an odd number span is reduced by multiply of $(1-\beta)$ times, and the amount of dispersion compensation corresponding to the reduction ($\beta$) is added to that on an even number span. That is, the ratio of the dispersion compensations of the DCFs 901 and 903 is multiplied by $(1-\beta)$ times, and the ratio of the dispersion compensation of the DCFs 902 and 904 is multiplied by $(1+\beta)$. Incidentally, $\beta$ is defined as a non-equal ratio.

Figure 25:
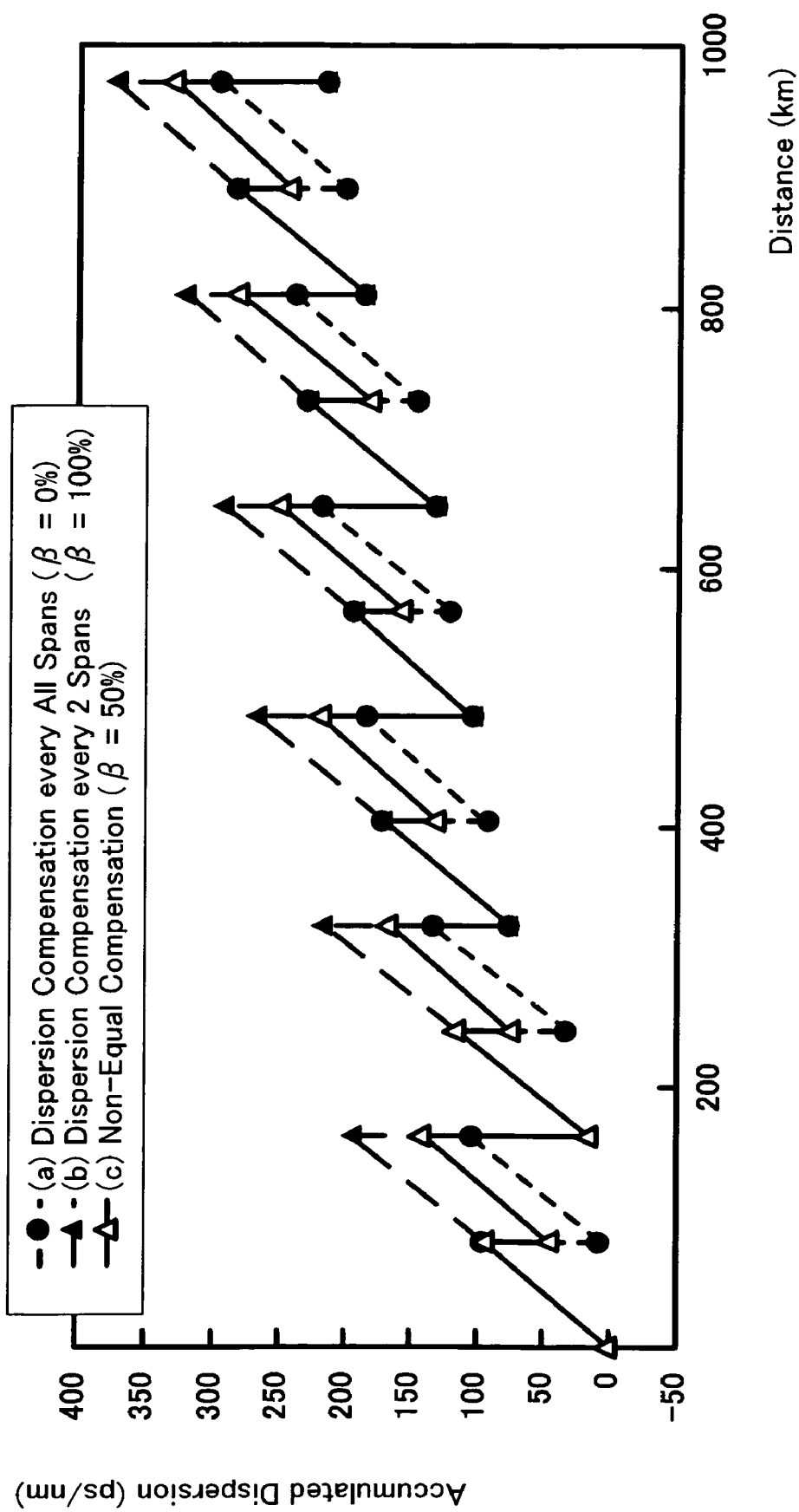
FIG. 25 is a diagram showing a relationship between the distance and the accumulated dispersion upon changing a non-equal ratio β.

FIG. 25 is a diagram showing a relationship between the distance and the accumulated dispersion upon changing the non-equal ratio $\beta$. Referring to FIG. 25, as the non-equal ratio $\beta$ is larger, the number of times for setting the accumulated dispersion to approximately the zero is reduced. Incidentally, the case in which the non-equal ratio $\beta$ is 100% is equivalent to the case in which the DCFs are arranged every 2 spans (refer to FIG. 19).

Figure 26:
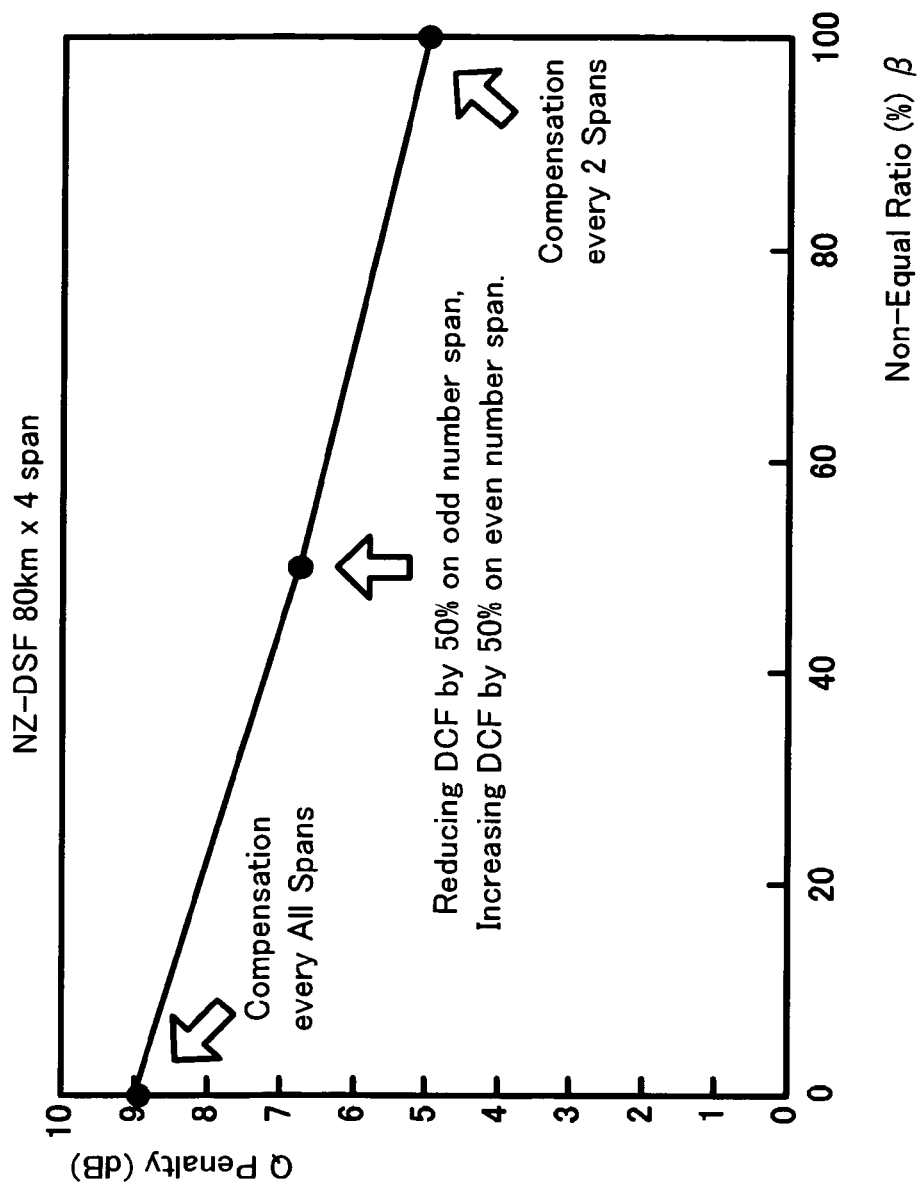
FIG. 26 is a diagram showing the non-equal ratio β and the Q penalty.
Figure 27:
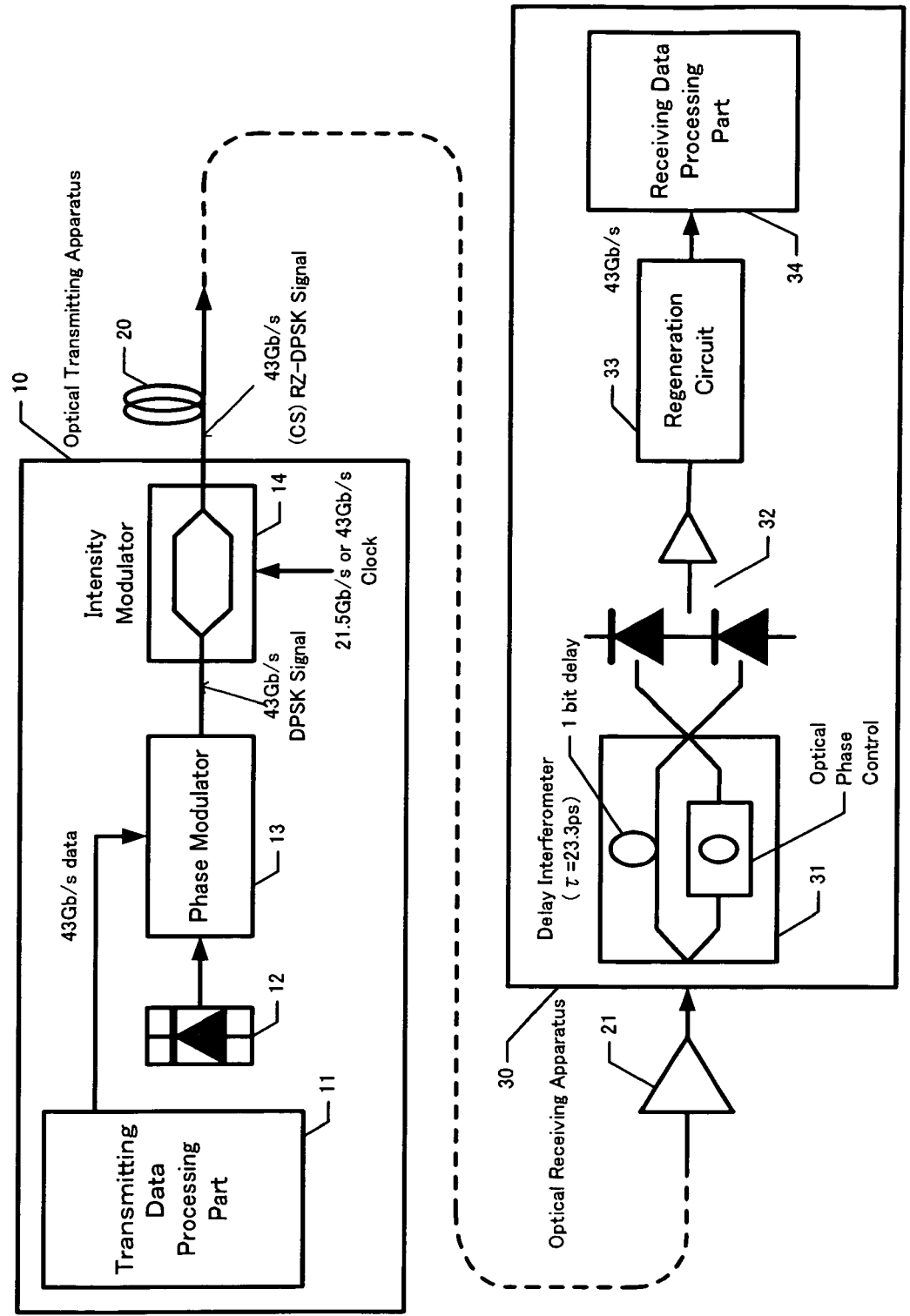
FIG. 27 is a diagram showing an example of the structure of an optical transmitting apparatus and an optical receiving apparatus using RZ-DPSK or CSRZ-DPSK modulation with 43 Gbit/s.
Figure 28:
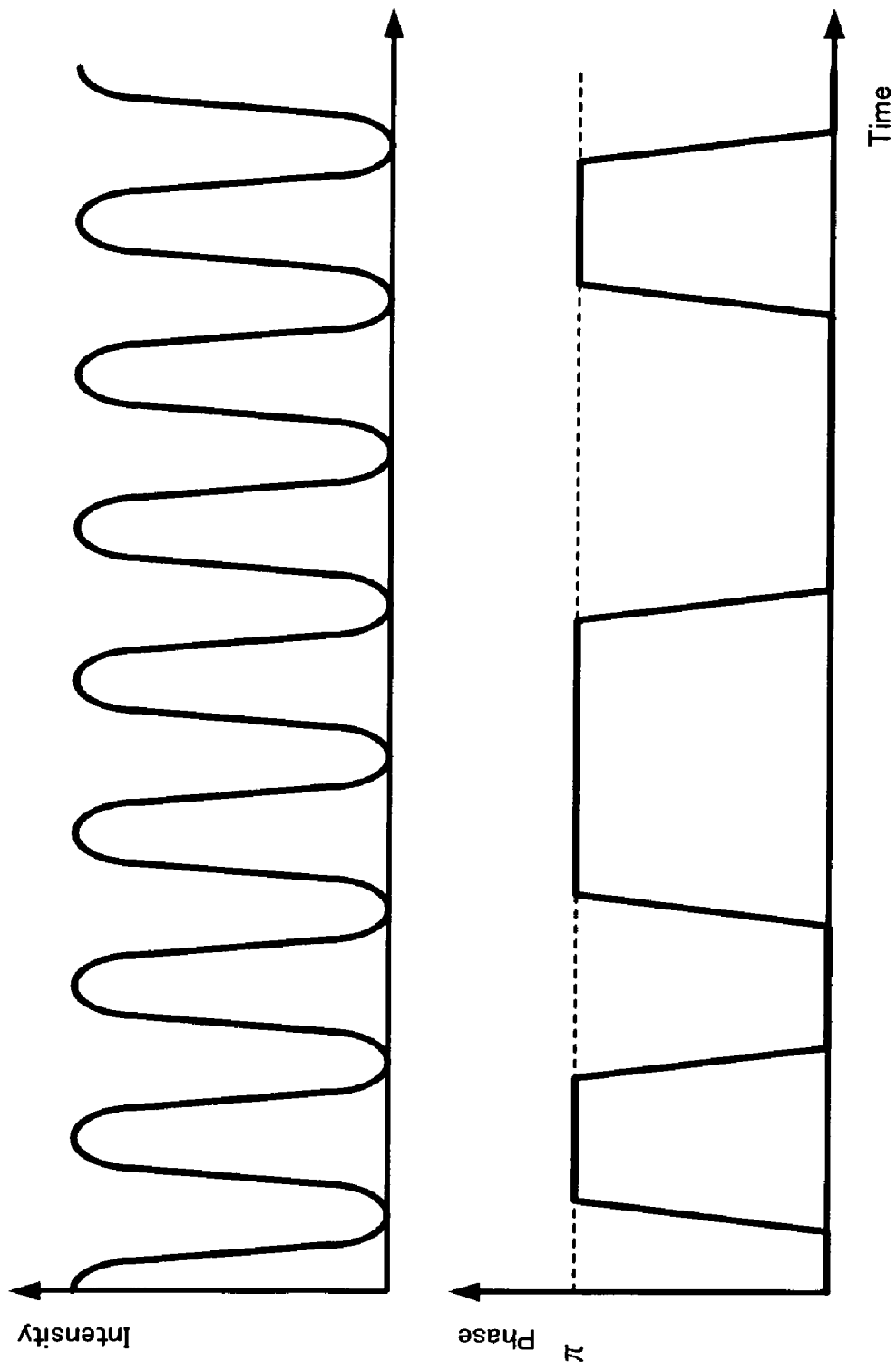
FIG. 28 is a diagram showing the optical intensity and the optical phase upon transmitting and receiving the optical signal subjected to the RZ-DPSK or CSRZ-DQPSK modulation.
Figure 29:
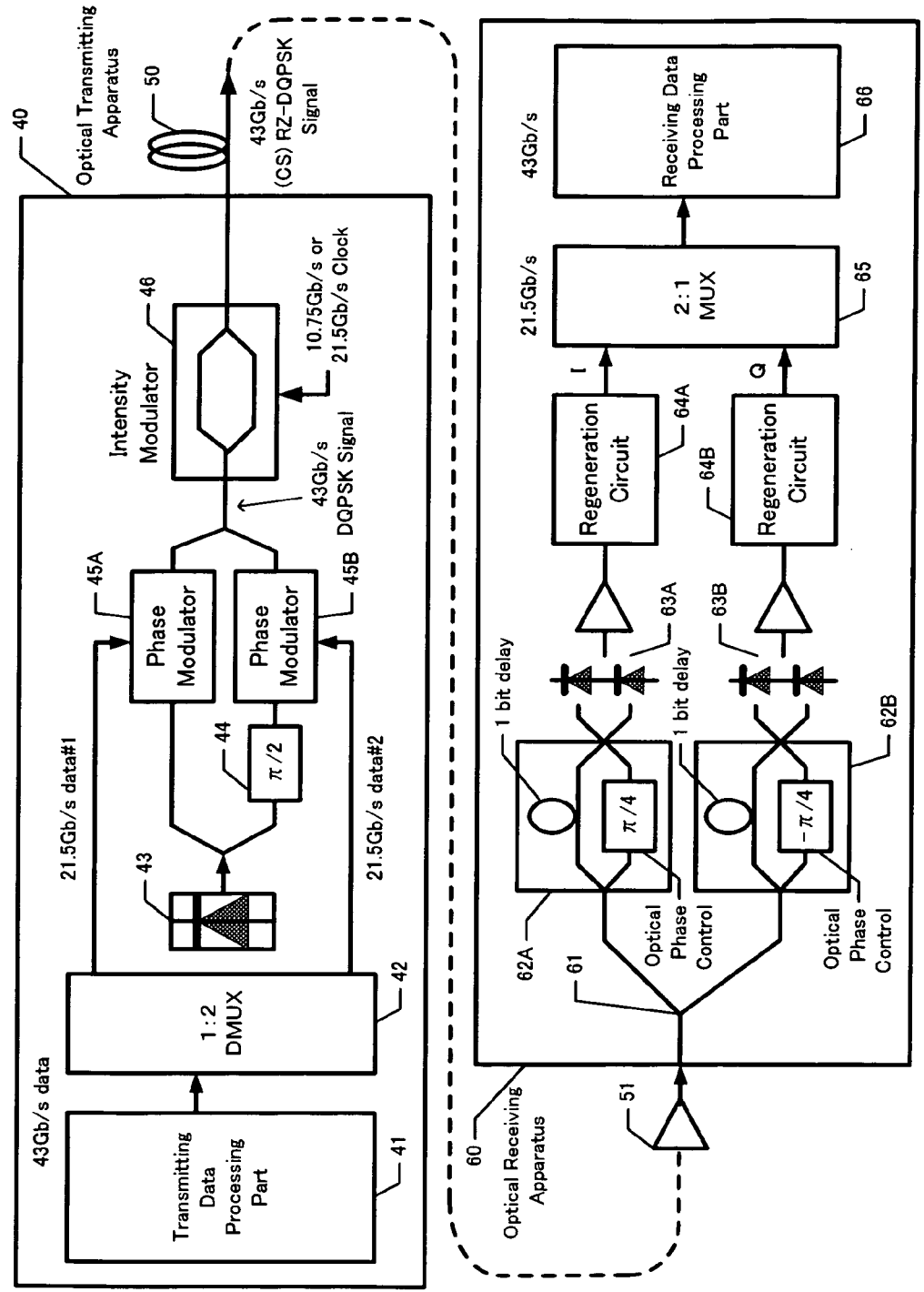
FIG. 29 is a diagram showing an example of the structure of the optical transmitting apparatus and the optical receiving apparatus using the RZ-DQPSK or CSRZ-DQPSK modulation with 43 Gbit/s.
Figure 30:
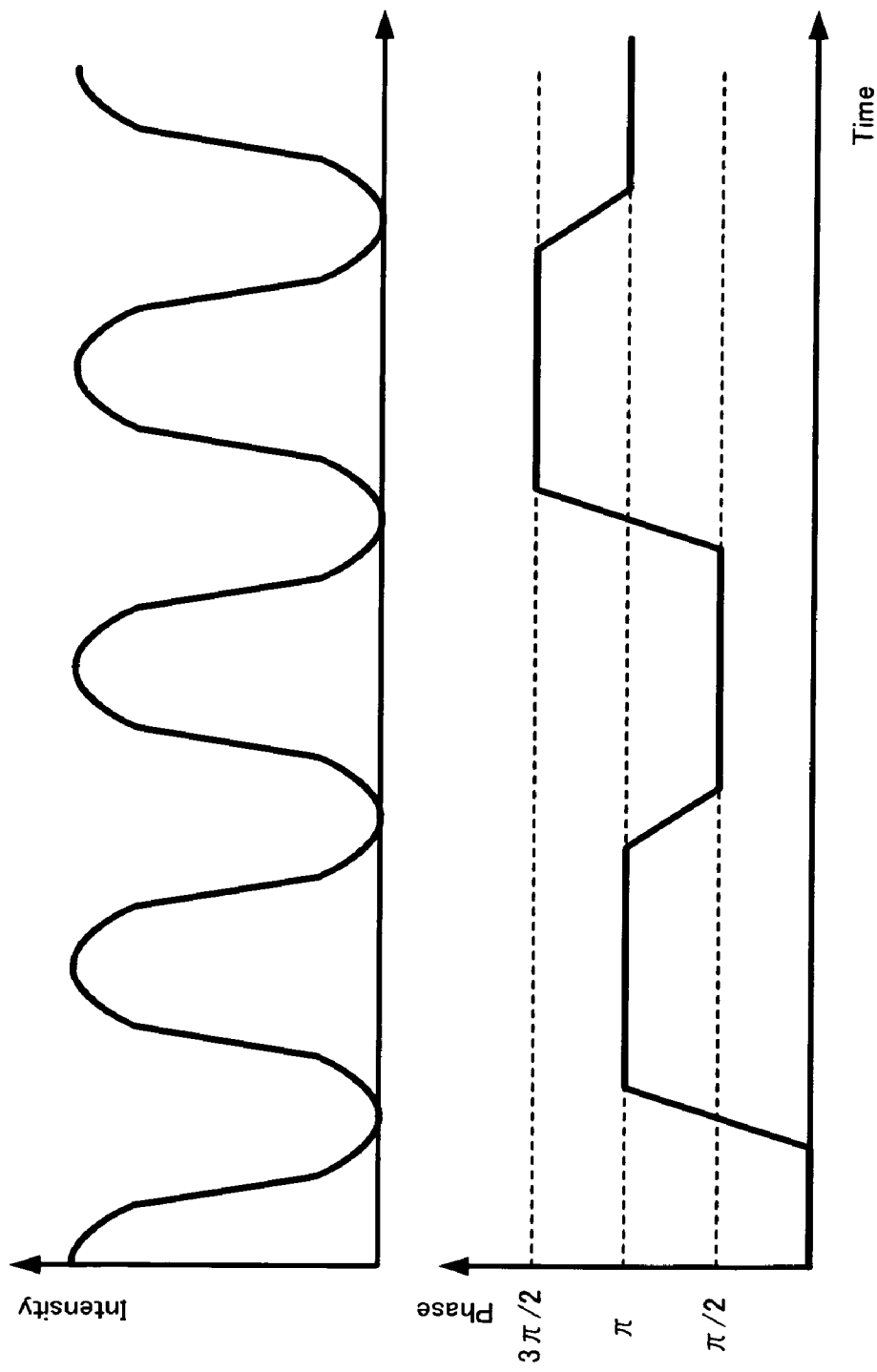
FIG. 30 is a diagram showing the optical intensity and the optical phase upon transmitting and receiving the optical signal subjected to the RZ-DPSK or CSRZ-DPSK modulation.

FIG. 26 is a diagram showing a relationship between the non-equal ratio $\beta$ and the Q penalty. Referring to FIG. 26, obviously, as the non-equal ratio $\beta$ is larger, the value of the Q penalty is reduced. Because the amount of dispersion compensation of the DCF is non-equal, the number of times for setting the accumulated dispersion to zero is reduced (refer to FIG. 25), and the number of times for imposing the penalty to the phase modulation signal by the intensity modulation signal is decreased.

As mentioned above, with the wavelength multiplexing transmission system according to the fourth embodiment, the radio of the dispersion compensation is periodically changed to set the DCF. The number of times for setting the accumulated dispersion to approximately the zero is reduced, thereby preventing the XPM degradation.

Incidentally, with the wavelength multiplexing transmission system according to the fourth embodiment, the amount of dispersion compensation on the odd number span is reduced, and the amount of dispersion compensation on the even number span is increased. However, the present art is not limited to this, the amount of dispersion compensation on the odd number span may be increased and the amount of dispersion compensation on the even number span may be decreased. Alternatively, the amount of dispersion compensation every all spans may be non-equal for an iterative period of 3 or more spans.

Among the processing described according to the embodiments, all or one part of the automatic processing can be manually executed. Alternatively, all or one part of the manual processing may be automatically executed by the well-known method. In addition, it is possible to arbitrarily change the processing sequence, control sequence, component names, and information including various data and parameters in the document and the drawings, except for Note.

Further, the wavelength multiplexing transmission system according to the first to fourth embodiments is function-conceptually structured, and does not need to be physically structured as shown in the drawings. That is, the disintegration and integration are not limited to those as shown in the drawings, and all or one part thereof can be functionally or physically disintegrated or integrated on the basis of an arbitrary unit in accordance with various loads and using situations. Moreover, all or one part of the processing functions performed by the apparatus is realized by a CPU or a program that is analyzed and executed by the CPU and, alternatively, is realized as the hardware using wired logic.

As mentioned above, the transmission system according to the present art is advantageous for transmit optical signals generated by different modulations via the same transmission line, and particularly, is suitable to the case of suppressing the XPM degradation caused in the optical signals.

What is claimed is:

1. A transmission system for transmitting a first optical signal modulated by a first transmitter and a second optical signal modulated by a second transmitter through a same transmission line, the first optical signal being modulated by phase modulation, and the second optical signal being modulated by intensity modulation, the transmission system comprising:
    a wavelength division multiplexing unit for generating a multiplexed optical signal obtained by multiplexing the first optical signal and the second optical signal by wavelength division multiplexing; and
    a dispersion compensating unit for adjusting an amount of dispersion compensation of the multiplexed optical signal so that an absolute value of an amount of residual dispersion per span generated in the multiplexed optical signal is a threshold or more in transmitting the multiplexed optical signal through the transmission line, and
    wherein the amount of dispersion compensation adjusted based on a time slot
    in which the second transmitter transmits the second optical signal, and a wavelength interval between
    the first optical signal and the second optical signal which are multiplexed at the wavelength division multiplexing unit.

2. The transmission system according to claim 1, further comprising:
    a pre-dispersion compensating unit for setting a value of the amount of residual dispersion of the multiplexed optical signal for which the dispersion compensation is performed at a transmitting terminal, to a negative value, and
    wherein a chirping parameter is set to a positive value when the second transmitter generates the second optical signal.

3. The transmission system according to claim 1, wherein the wavelength division multiplexing unit arranges a wavelength interval between a wavelength to which the first optical signal is assigned and a wavelength to which the second optical signal is assigned so as to have a predetermined value or more upon multiplexing the first optical signal and the second optical signal.

4. The transmission system according to claim 3, wherein the wavelength division multiplexing unit assigns the first optical signal to a short wavelength side of the multiplexed optical signal, and assigns the second optical signal to a long wavelength side of the multiplexed optical signal.

5. The transmission system according to claim 3, wherein the wavelength division multiplexing unit assigns the first optical signal to a long wavelength side of the multiplexed optical signal, and assigns the second optical signal to a short wavelength side of the multiplexed optical signal.

6. The transmission system according to claim 1, wherein the wavelength division multiplexing unit assigns the first optical signal and the second optical signal to each wavelength of the multiplexed optical signal on a basis of the amount of residual dispersion to each span for the wavelength.

7. The transmission system according to claim 1, wherein the dispersion compensation unit is arranged with respect to each predetermined span on the transmission line.

8. The transmission system according to claim 7, wherein the dispersion compensation unit arranged on the transmission line has a non-equally adjusted amount of dispersion compensation.

9. A transmission method of a transmission system for transmitting a first optical signal modulated by a first transmitter and a second optical signal modulated by a second transmitter through a same transmission line, the first optical signal being modulated by phase modulation, and the second optical signal being modulated by intensity modulation, the transmission method of the transmission system comprising:
generating a multiplexed optical signal obtained by multiplexing the first optical signal and the second optical signal by wavelength division multiplexing; and
adjusting an amount of dispersion compensation of the multiplexed optical signal so that an absolute value of an amount of residual dispersion per span generated in the multiplexed optical signal is a threshold or more in transmitting the multiplexed optical signal through the transmission line, and
wherein the amount of dispersion compensation is adjusted, based on a time slot in which
the second transmitter transmits the second optical signal, and
a wavelength interval between the first optical signal and the second optical signal which are multiplexed.

10. The transmission method according to claim 9, further comprising:
setting a value of the amount of residual dispersion of the multiplexed optical signal for which the dispersion compensation is performed at a transmitting terminal, to a negative value, and
wherein a chirping parameter is set to a positive value when the second transmitter generates the second optical signal.

11. The transmission method according to claim 9, wherein the generating arranges a wavelength interval between a wavelength to which the first optical signal is assigned and a wavelength to which the second optical signal is assigned so as to have a predetermined value or more upon multiplexing the first optical signal and the second optical signal.

12. The transmission method according to claim 11, wherein the generating assigns the first optical signal to a short wavelength side of the multiplexed optical signal, and assigns the second optical signal to a long wavelength side of the multiplexed optical signal.

13. The transmission method according to claim 11, wherein the generating assigns the first optical signal to a long wavelength side of the multiplexed optical signal, and assigns the second optical signal to a short wavelength side of the multiplexed optical signal.

14. The transmission method according to claim 9, wherein the generating assigns the first optical signal and the second optical signal to each wavelength of the multiplexed optical signal on a basis of the amount of residual dispersion to each span for the wavelength.

15. The transmission method according to claim 9, wherein the adjusting is implemented with respect to each predetermined span on the transmission line.

16. The transmission method according to claim 15, wherein the adjusting implemented on the transmission line has a non-equally adjusted amount of dispersion compensation.

* * * * *

UNITED STATES PATENT AND TRADEMARK OFFICE
CERTIFICATE OF CORRECTION

PATENT NO. : 7,983,564 B2  
APPLICATION NO. : 12/068026  
DATED : July 19, 2011  
INVENTOR(S) : Hiroki Ooi et al.

Page 1 of 1

It is certified that error appears in the above-identified patent and that said Letters Patent is hereby corrected as shown below:

Column 20, Line 34, In Claim 1, after "compensation" insert --is--.

Signed and Sealed this  
Twenty-seventh Day of September, 2011

David J. Kappos  
*Director of the United States Patent and Trademark Office*